United States Patent
Yang et al.

(10) Patent No.: US 11,627,486 B2
(45) Date of Patent: Apr. 11, 2023

(54) DATA SENDING METHOD AND APPARATUS, AND DEVICE

(71) Applicant: XFUSION DIGITAL TECHNOLOGIES CO., LTD., Zhengzhou (CN)

(72) Inventors: Fei Yang, Beijing (CN); Xinpeng Wei, Beijing (CN); Zhe Chen, Beijing (CN)

(73) Assignee: XFUSION DIGITAL TECHNOLOGIES CO., LTD., Zhengzhou (CN)

(*) Notice: Subject to any disclaimer, the term of this patent is extended or adjusted under 35 U.S.C. 154(b) by 23 days.

(21) Appl. No.: 16/832,524

(22) Filed: Mar. 27, 2020

(65) Prior Publication Data

US 2020/0229024 A1    Jul. 16, 2020

Related U.S. Application Data

(63) Continuation of application No. PCT/CN2018/119338, filed on Dec. 5, 2018.

(30) Foreign Application Priority Data

Dec. 28, 2017  (CN) .......................... 201711457744.6

(51) Int. Cl.
*H04W 28/24* (2009.01)
*H04W 28/02* (2009.01)
(Continued)

(52) U.S. Cl.
CPC ......... *H04W 28/0268* (2013.01); *H04L 67/14* (2013.01); *H04W 28/06* (2013.01); *H04W 28/24* (2013.01); *H04W 76/12* (2018.02)

(58) Field of Classification Search
CPC ..... H04W 28/24; H04W 76/10; H04W 28/02; H04W 28/06; H04W 28/0268; H04L 67/14
See application file for complete search history.

(56) References Cited

U.S. PATENT DOCUMENTS

| 8,913,748 B2 | 12/2014 | Ho et al. |
| 2011/0194433 A1 | 8/2011 | Song et al. |

(Continued)

FOREIGN PATENT DOCUMENTS

| CN | 102823319 A | 12/2012 |
| CN | 107006045 A | 8/2017 |

(Continued)

OTHER PUBLICATIONS

EPO Communication pursuant to Rule 164(1) EPC Supplementary European Search Report issued in European Application No. 18893444.2 dated Mar. 11, 2021, 19 pages.

(Continued)

*Primary Examiner* — Syed Ali
(74) *Attorney, Agent, or Firm* — Rimon PC

(57) ABSTRACT

This disclosure provides a data sending method and apparatus, and a device, and pertains to the field of communications technologies. An example method includes: receiving an uplink data packet sent by UE; if a signaling message is carried in the uplink data packet, separating the signaling message from the uplink data packet, where the signaling message is used to request to establish a PDU session or request to activate an established PDU session; forwarding the signaling message to a control plane device; and before an available PDU session exists, forwarding, based on a data forwarding message carried in the uplink data packet sent by the UE, data in the uplink data packet sent by the UE.

5 Claims, 17 Drawing Sheets

(51) Int. Cl.
*H04W 76/12* (2018.01)
*H04L 67/14* (2022.01)
*H04W 28/06* (2009.01)

(56) References Cited

U.S. PATENT DOCUMENTS

| | | | |
|---|---|---|---|
| 2012/0155460 A1 | 6/2012 | Gu et al. | |
| 2012/0178438 A1 | 7/2012 | Vashi et al. | |
| 2016/0165572 A1 | 1/2016 | Chang et al. | |
| 2016/0142321 A1 | 5/2016 | Gage | |
| 2017/0086221 A1 | 3/2017 | Jover | |
| 2017/0339609 A1* | 11/2017 | Youn | H04W 76/11 |
| 2018/0262924 A1* | 9/2018 | Dao | H04W 24/08 |
| 2018/0376384 A1* | 12/2018 | Youn | H04W 92/02 |
| 2019/0075511 A1* | 3/2019 | Ryu | H04W 68/005 |
| 2019/0124572 A1* | 4/2019 | Park | H04W 36/0088 |
| 2019/0223152 A1 | 7/2019 | Ke et al. | |
| 2020/0037386 A1* | 1/2020 | Park | H04W 80/10 |
| 2020/0137675 A1* | 4/2020 | Park | H04W 68/005 |
| 2020/0145953 A1* | 5/2020 | Youn | H04W 60/04 |

FOREIGN PATENT DOCUMENTS

| | | |
|---|---|---|
| CN | 107018542 A | 8/2017 |
| CN | 107241764 A | 10/2017 |
| CN | 107371215 A | 11/2017 |
| CN | 107396356 A | 11/2017 |
| EP | 2802163 A1 | 11/2014 |
| NO | 2016198101 A1 | 12/2016 |
| WO | 2015013869 A1 | 2/2015 |

OTHER PUBLICATIONS

Intel, "Way forward on common CN-AN interface for untrusted access," SA WG2 Meeting #118, S2-166625, Reno, Nevada, USA, Nov. 14-18, 2016, 6 pages.

3GPP TS 23.502 V15.0.0 (Dec. 2017), "3rd Generation Partnership Project; Technical Specification Group Services and System Aspects; Procedures for the 5G System; Stage 2 (Release 15)," Dec. 2017, 258 pages.

Extended European Search Report issued in European Application No. 18893444.2 dated Jul. 21, 2021, 19 pages.

Office Action issued in Chinese Application No. 201711457744.6 dated Mar. 3, 2020, 9 pages (With English Translation).

PCT International Search Report and Written Opinion in International Application No. PCT/CN2018/119,338, dated Jan. 31, 2019, 12 pages (With Partial English Translation).

* cited by examiner

DATA SENDING METHOD AND APPARATUS, AND DEVICE

CROSS-REFERENCE TO RELATED APPLICATIONS

This application is a continuation of International Application No. PCT/CN2018/119338, filed on Dec. 5, 2018, which claims priority to Chinese Patent Application No. 201711457744.6, filed on Dec. 28, 2017. The disclosures of the aforementioned applications are hereby incorporated by reference in their entireties.

TECHNICAL FIELD

This disclosure relates to the field of communications technologies, and in particular, to a data sending method and apparatus, and a device.

BACKGROUND

A 5th generation mobile communication (5G) technology, as an extension of a 4th generation mobile communication, (4G) technology, has currently become a research focus. As shown in FIG. 1, an enhanced mobile broadband (eMBB) service, a massive machine-type communications (mMTC) service, and an ultra-reliable and low-latency communications (URLLC) service are three major services in a 5G network. Particularly for the URLLC service, because of its low latency and high reliability, the URLLC service is currently widely applied in scenarios such as the Internet of vehicles, industrial control, and a smart grid.

In related technologies, before sending a data packet, user equipment (UE) needs to first establish a packet data unit (PDU) session (session), that is, establish a user plane channel for sending a data packet. The UE can send the data packet only after the channel is established. The PDU session is a connection association between the UE and a data network (DN), and is used to provide a connection service for the UE to access the DN. In other words, the PDU session may be understood as a virtual link between the UE and the DN.

Currently, the UE supports only a data sending manner based on a PDU session. To be specific, data can be sent only after the PDU session is established. However, establishment of the PDU session usually results in a relatively long latency that is usually longer than 100 ms. The latency is far longer than a latency requirement of a low-latency service. In this case, in a low-latency service scenario, how to send data is an urgent problem to be resolved by a person skilled in the art.

SUMMARY

Embodiments of this disclosure provide a data sending method and apparatus, and a device, to resolve a problem that a latency requirement of a low-latency service cannot be met in related technologies. The technical solutions are as follows:

According to a first aspect, a data sending method is provided. The method is applied to a base station device and includes:

receiving an uplink data packet sent by UE;

if a signaling message is carried in the uplink data packet, separating the signaling message from the uplink data packet, where the signaling message is used to request to establish a PDU session or request to activate an established PDU session;

forwarding the signaling message to a control plane device, so that the control plane device establishes the PDU session or activates the established PDU session; and before an available PDU session exists, forwarding, based on a data forwarding message carried in the uplink data packet sent by the UE, data in the uplink data packet sent by the UE.

The available PDU session may refer to an established PDU session, or may refer to an activated PDU session. In addition, if the base station device receives the downlink data packet sent by the UE, the base station device forwards the downlink data packet through an air interface.

In a possible implementation, the forwarding, based on a data forwarding message carried in the uplink data packet sent by the UE, data in the uplink data packet sent by the UE includes:

determining whether the data forwarding message includes path information of the uplink data packet;

if the data forwarding message includes the path information, determining a shared link between the base station device and a target user plane network element (UPF) based on a quality of service (QoS) class identifier included in the data forwarding message, where the target UPF is a UPF indicated in the path information; and forwarding the data in the uplink data packet to the target UPF over the shared link.

In a possible implementation, the forwarding, based on a data forwarding message carried in the uplink data packet sent by the UE, data in the uplink data packet sent by the UE includes:

determining whether the data forwarding message includes path information of the uplink data packet;

if the data forwarding message does not include the path information of the uplink data packet, selecting a target routing table based on network slice selection assistance information (NSSAI) included in the data forwarding message;

searching the target routing table based on an Internet protocol (IP) address that is of a communications peer end and that is carried in the uplink data packet and obtaining a target UPF;

determining a shared link between the base station device and the target UPF based on a QoS class identifier included in the data forwarding message; and forwarding the data in the uplink data packet to the target UPF over the shared link.

In a possible implementation, the forwarding the data in the uplink data packet to the target UPF over the shared link includes:

determining whether a transmission rate of the uplink data packet is less than a specified maximum bit rate (MBR) value; and if the transmission rate of the uplink data packet is less than the specified MBR value, forwarding the data in the uplink data packet to the target UPF over the shared link.

In a possible implementation, the forwarding the signaling message to a control plane device includes:

selecting a target access control and mobility management function (AMF) entity based on NSSAI included in the data forwarding message; and forwarding the signaling message to the target AMF entity.

In a possible implementation, the method further includes:

selecting a target AMF entity based on the NSSAI included in the data forwarding message; and forwarding address information of the target UPF to the target AMF entity.

According to a second aspect, a data sending method is provided. The method is applied to UE and includes:

determining whether a PDU session is established;

if the PDU session is not established, determining whether a first signaling message is sent, where the first signaling message is used to request to establish the PDU session;

if the first signaling information is not sent, inserting the generated first signaling message into a to-be-sent uplink data packet;

inserting a data forwarding message into the to-be-sent uplink data packet; and sending, to a base station device, the uplink data packet obtained after the insertion, where the base station device is configured to: forward the first signaling message to a control plane device, and before establishment of the PDU session is completed, forward, based on the data forwarding message carried in the uplink data packet sent by the UE, data in the uplink data packet sent by the UE.

In a possible implementation, the method further includes:

if the PDU session is established, determining whether the UE is in an idle mode:

if the UE is in the idle mode, inserting a second signaling message into a to-be-sent uplink data packet, where the second signaling message is used to request to activate the established PDU session;

inserting a data forwarding message into the to-be-sent uplink data packet; and sending, to the base station device, the uplink data packet obtained after the insertion, where the base station device is configured to: forward the second signaling message to the control plane device; and before activation of the PDU session is completed, forwarding, based on the data forwarding message carried in the uplink data packet sent by the UE, the data in the uplink data packet sent by the UE.

In a possible implementation, the inserting a data forwarding message into the to-be-sent uplink data packet includes:

determining whether path information of the uplink data packet is stored:

if the path information is stored, inserting the path information into the uplink data packet, or if the path information is not stored, inserting NSSAI into the uplink data packet;

inserting QoS information into the uplink data packet, where the QoS information includes a QoS class identifier and an MBR value:

setting low-order N bits in a source address of the uplink data packet as identification information of the UE; and setting high-order N bits in the source address of the uplink data packet to preset values.

A value of N may be set to 64. This is not specifically limited in this embodiment of this disclosure.

According to a third aspect, a data sending method is provided. The method is applied to a UPF and includes:

receiving data in an uplink data packet forwarded by UE to a base station device, where the uplink data packet includes a first signaling message used to request to establish a PDU session;

if high-order N bits in a source address of the uplink data packet are preset values, searching for an IP prefix of the UE based on low-order N bits in the source address;

if the IP prefix is found, inserting the IP prefix into the high-order N bits in the source address; and recording path information of the uplink data packet, and forwarding the data in the uplink data packet.

The preset values may be set to 0s. This is not specifically limited in this embodiment of this disclosure.

In a possible implementation, the method further includes:

if the IP prefix is not found, allocating an N-bit IP prefix to the UE:

inserting the allocated IP prefix into the high-order N bits in the source address; and recording a correspondence between the allocated IP prefix and identification information of the UE.

In a possible implementation, the method further includes:

receiving data in an uplink data packet forwarded by the UE to the base station device, where the uplink data packet includes a second signaling message used to request to activate an established PDU session; and forwarding the data in the uplink data packet to the initial UPF based on specified address information included in path information of the uplink data packet, so that the initial UPF forwards the data in the uplink data packet, where the specified address information is address information of the initial UPF, and the initial UPF is a UPF that allocates the IP prefix to the UE.

According to a fourth aspect, a data sending method is provided. The method is applied to a session management function (Session Management Function, SMF) entity in a control plane device and includes:

receiving a first signaling message and address information of a target UPF that are forwarded by a target AMF entity, where the target AMF entity is configured to: determine a target SMF entity after receiving the address information sent by a base station device, and send the first signaling message and the address information to the target SMF entity;

sending, based on the address information, a specified message including identification information of UE to the target UPF, so that the target UPF searches, based on the identification information of the UE, for an IP prefix allocated to the UE, where the specified message is generated based on the first signaling message, receiving the IP prefix that is of the UE and that is returned by the target UPF; and recording the IP prefix of the UE, and returning the IP prefix to the UE.

According to a fifth aspect, a data sending apparatus is provided. The apparatus is configured to perform the data sending method in any one of the first aspect or the possible implementations of the first aspect.

According to a sixth aspect, a data sending apparatus is provided. The apparatus is configured to perform the data sending method in any one of the second aspect or the possible implementations of the second aspect.

According to a seventh aspect, a data sending apparatus is provided. The apparatus is configured to perform the data sending method in any one of the third aspect or the possible implementations of the third aspect.

According to an eighth aspect, a data sending apparatus is provided. The apparatus is configured to perform the data sending method in the fourth aspect.

According to a ninth aspect, a base station device is provided. The base station device includes a processor and a memory. The memory stores at least one instruction. The at least one instruction is loaded and executed by the processor to implement the data sending method in any one of the first aspect or the possible implementations of the first aspect.

According to a tenth aspect, user equipment is provided. The user equipment includes a processor and a memory. The memory stores at least one instruction. The at least one instruction is loaded and executed by the processor to implement the data sending method in any one of the second aspect or the possible implementations of the second aspect.

According to an eleventh aspect, a user plane network element is provided. The user plane network element includes a processor and a memory. The memory stores at least one instruction. The at least one instruction is loaded and executed by the processor to implement the data sending method in any one of the third aspect or the possible implementations of the third aspect.

According to a twelfth aspect, an SMF entity is provided. The SMF entity includes a processor and a memory. The memory stores at least one instruction. The at least one instruction is loaded and executed by the processor to implement the data sending method in the fourth aspect.

According to a thirteenth aspect, a storage medium is provided. The readable storage medium stores an instruction. The instruction is executed by the processor to complete the data sending method in any one of the first aspect to the fourth aspect and the possible implementations of the first aspect to the fourth aspect.

The technical solutions provided in the embodiments of this disclosure have the following beneficial effects:

Before the available PDU session exists, the UE adds, to the data packet on a data link, the signaling message used to request to establish the PDU session or request to activate the established PDU session, and further adds an additional data forwarding message to the data packet. In this way, w en the PDU session establishment process or the PDU session activation process is triggered, the data can be further sent by using the data forwarding message carried in the data packet. Therefore, the data packet can still be sent in real time when no available PDU session exists, thereby greatly meeting a latency requirement of a low-latency service.

DESCRIPTION OF EMBODIMENTS

To make the objectives, technical solutions, and advantages of this disclosure clearer, the following further describes the implementations of this disclosure in detail with reference to the accompanying drawings.

Before a data sending method provided in the embodiments of this disclosure is explained in detail, a network structure of a 5G network is first described.

Figure 1:
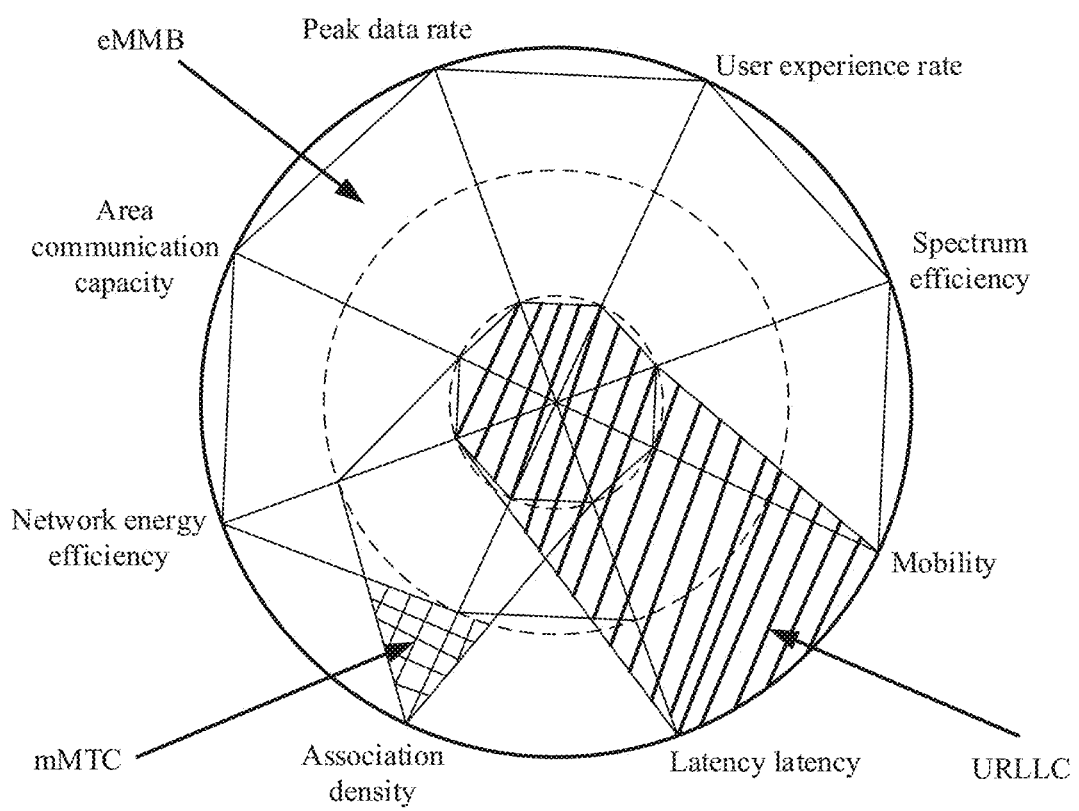
FIG. 1 is a schematic diagram of various services provided for a 5G network according to an embodiment of this disclosure.
Figure 2:
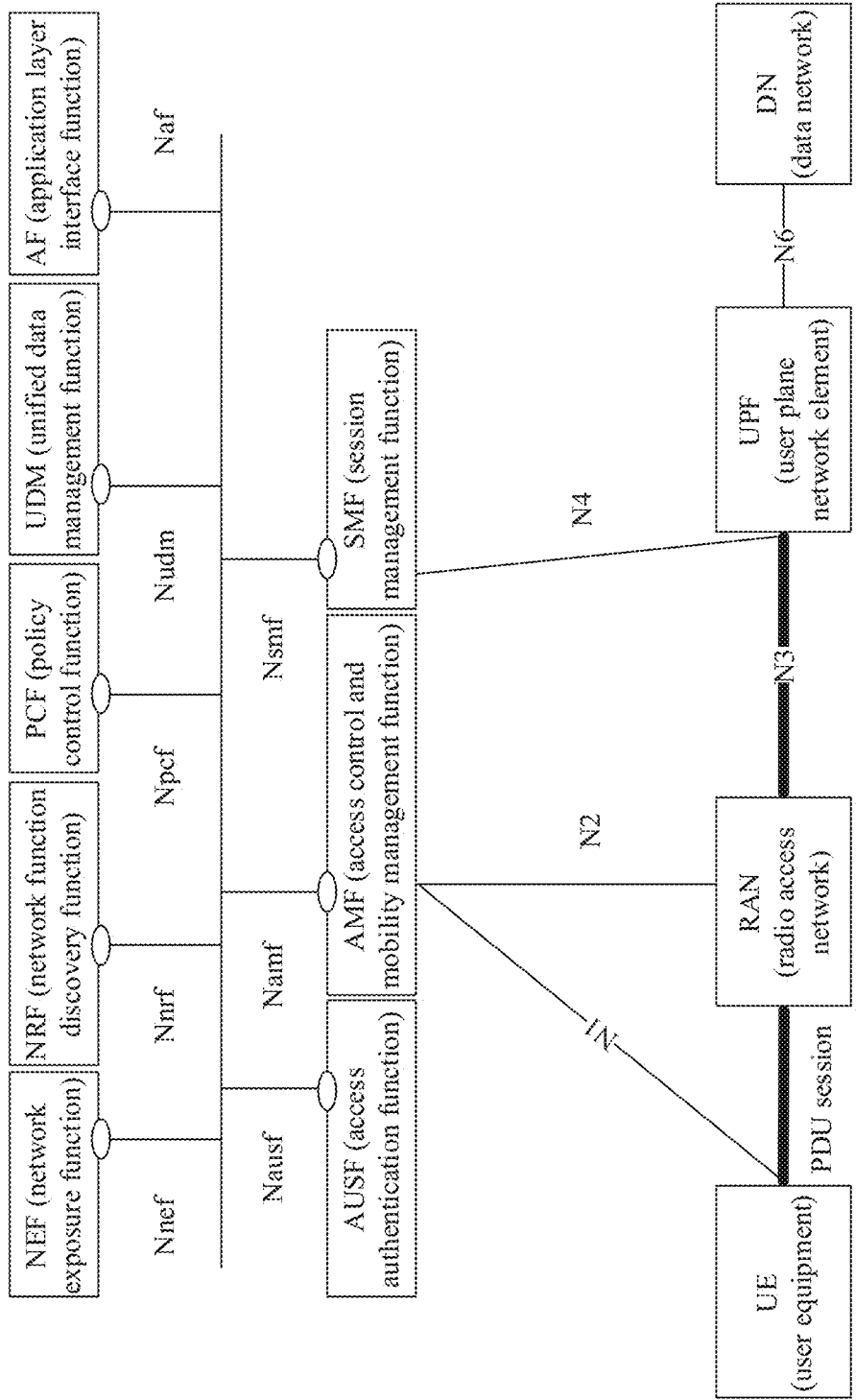
FIG. 2 is a schematic diagram of a network structure of a 5G network according to an embodiment of this disclosure.

As shown in FIG. 2, the network structure mainly includes the following network entities: UE, a RAN, a UPF, a DN, an AMF, an SMF, an access authentication function, (AUSF), a network exposure function (NEF), a network function discovery function (NRF), a policy control function PCF), a unified data management (UDM) function, and an application layer interface function (AF).

The UE may be a mobile phone, the RAN is a base station device, the UPF is a gateway device, the DN is a network on which a network resource accessed by the UE is located, the UDM mainly manages subscription information of a user, and the AF is mainly used to obtain information about an application layer.

It should be noted that, in the embodiments of this disclosure, a PDU session is also referred to as a PDU session and is a connection association between the UE and the DN. The PDU session is used to provide a connection service for the UE to access the DN. In other words, the PDU session may be understood as a virtual link between the UE and the DN. In other words, the PDU session is used to determine a forwarding path of a data packet on the 5G network. As shown in the black bold part in FIG. 2, the forwarding path relates to the RAN and one or more UPFs.

Figure 3A:
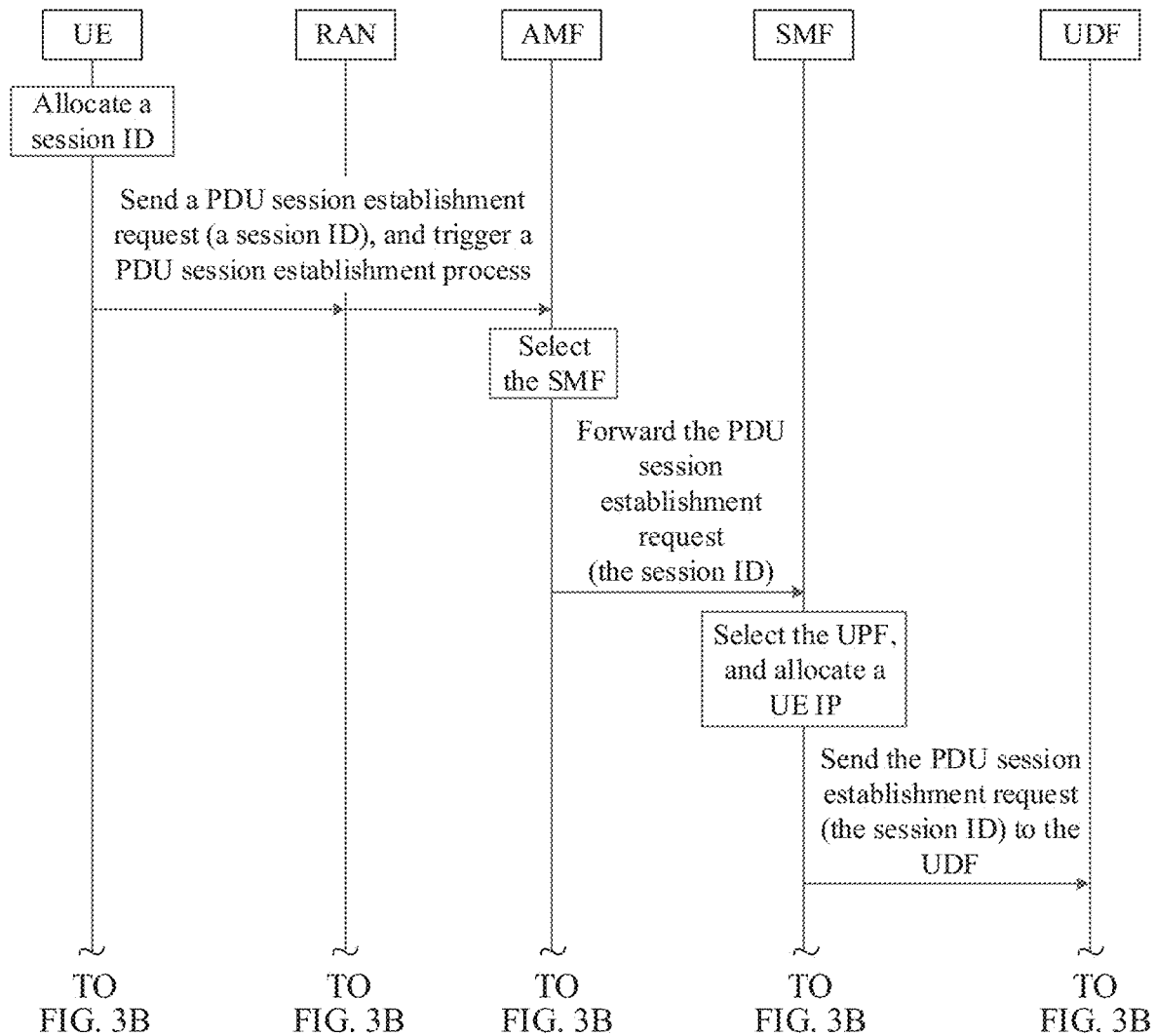
FIG. 3A and FIG. 3B are a schematic diagram of a PDU session establishment process according to a related technology.
Figure 3B:
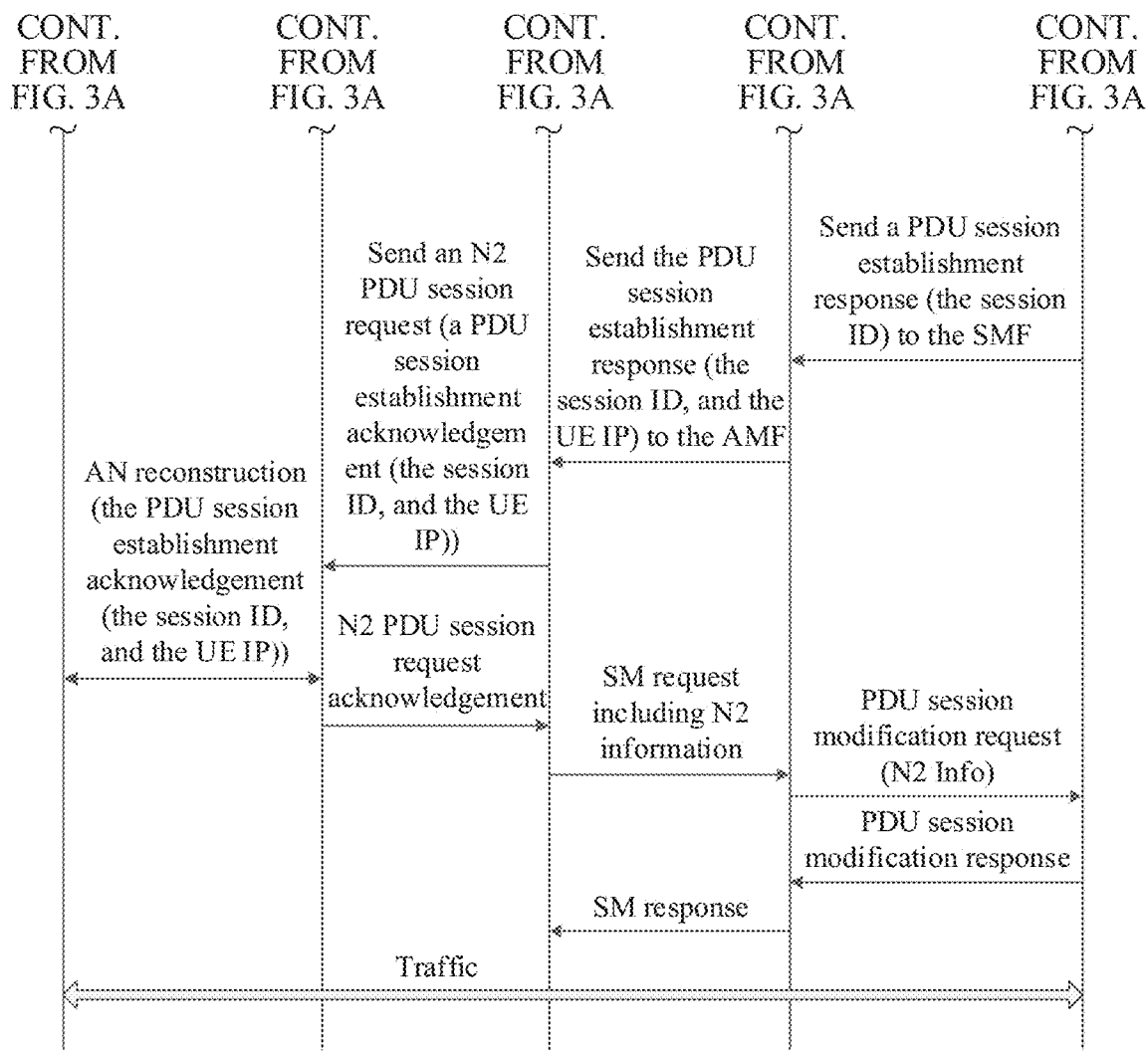

FIG. 3A and FIG. 3B show a PDU session establishment process in a related technology. With reference to FIG. 3A and FIG. 3B, the specific establishment process may be described as follows:

(1) UE allocates a session ID to a PDU session, and sends a PDU session establishment request (Establishment Req) message to an AMF entity, to trigger the PDU session establishment process.

(2) The AMF entity selects an SMF entity, and forwards the PDU session establishment request message to the selected SMF entity.

(3) The SMF entity selects a UPF, further allocates a UE IP, and then sends a PDU session establishment request message to the UPF. The UPF configures a user plane path, and sends a PDU session establishment response message to the SMF.

(4) The SMF entity sends the PDU session establishment response message to the AMF entity. The response message includes the allocated UE IP.

(5) The AMF entity sends a message (N2 PDU Session Req) to a RAN, and configures a user plane resource of the air interface and a path between the RAN and the UPF.

(6) During configuration of the path, corresponding QoS information is configured.

The QoS information includes a QoS class identifier (QCI), a maximum bit rate (MBR), and the like. The QCI is used to indicate a QoS level of a service (including different priorities, latency values, and packet loss rates), and the MBR refers to a maximum bandwidth of the service.

In the related technology, PDU session establishment is completed by performing the foregoing steps. After the PDU session establishment is completed, a path from the UE to the RAN and then to the UPF is completely established.

It can be learned from the foregoing description that, in the PDU session establishment process in the related technology, the SMF entity needs to select the UPF, allocates the UE IP, and configures the QoS information. In addition, the PDU session establishment process shown in FIG. 3A and FIG. 3B needs to be performed before data is sent. In other words, in the 5G network architecture shown in FIG. 2, a data sending process needs to be implemented when the PDU session is established. This undoubtedly cannot meet a low-latency requirement. In this case, the embodiments of this disclosure provide a new data sending method. To be specific, a problem that an existing process in the 5G network cannot meet a latency requirement of a low-latency service can be resolved in the embodiments of this disclosure.

An embodiment of this disclosure intends to provide a low-latency service processing mechanism in which control plane signaling can be carried in a data packet. The control plane signaling may be used to instruct to establish a PDU session, or may be used to trigger a service request process to activate an established PDU session. In addition, in this embodiment of this disclosure, a packet may be sent before a PDU session establishment process is completed. In other words, when PDU session establishment is not completed, UE may forward the data packet by using a sessionless forwarding mechanism. After the PDU session establishment is completed, the UE uses a PDU session-based forwarding mechanism.

It should be noted that network entities corresponding to this embodiment of this disclosure mainly include the UE, the RAN, the UPF, the AMF entity, and the SMF entity shown in FIG. 2. In this embodiment of this disclosure, the UE may be referred to as user equipment, the RAN may be referred to as a base station device, the UPF may be referred to as a gateway device, and the AMF entity and the SMF entity may be referred to as control plane devices.

For these network entities, a software module needs to be separately added, and the added software module may process a signaling message carried in the data packet and may forward the data packet in a sessionless manner.

The following describes a method procedure in the embodiments of this disclosure with reference to the foregoing content.

An embodiment of this disclosure defines a mechanism of adding control plane signaling to a data packet and a sessionless (that is, sessionless) data packet forwarding mechanism.

1. In this embodiment of this disclosure, a format of the data packet is extended, so that a signaling message may be carried in an extended data packet.

In addition to the signaling message, the data packet may further carry information required when the data packet is forwarded in a sessionless manner. The information is referred to as a data forwarding message in this embodiment of this disclosure. The data forwarding message may include slice information, path information, and QoS information. To be specific, slice information used to select the UPF may be carried in the data packet. Path information used to record and select uplink and downlink paths may be further carried in the data packet. QoS information used to ensure QoS during data forwarding may be further carried in the data packet.

Figure 4:
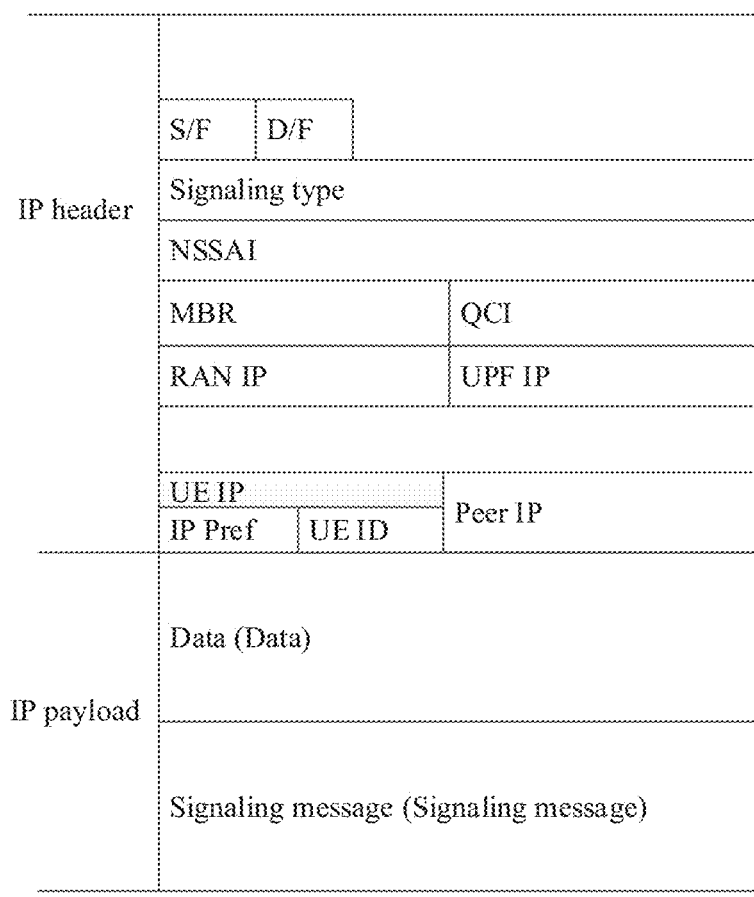
FIG. 4 is a schematic diagram of composition of a data packet according to an embodiment of this disclosure.

It should be further noted that, in the data packet in this embodiment of this disclosure, a UE ID is used as an IP address of a user. The UE ID may also be referred to as identification information of UE. Referring to FIG. 4, the following content is extended in an IP header:

S/F: A signaling message flag may be referred to as a signaling message flag and is used to identify whether a signaling message is carried in the data packet.

D/F: A data forwarding info flag may be referred to as a data forwarding information flag and is used to identify whether a data forwarding message required when data is forwarded in a sessionless manner is carried in the data packet.

Signaling type: This may be referred to as a signaling type, and a type of signaling carried in the IP header may be a PDU session request used to request to establish a PDU session, or may be a service request. This is not specifically limited in this embodiment of this disclosure.

NSSAI: Network slice selection assistance information may be referred to as network slice selection assistance information, that is, the foregoing slice information.

An MBR and a QCI are QoS information.

A RAN IP and a UPF IP specify or record a path of the data packet.

A UE ID is identification information of the UE, and may be a mobile subscriber number (ISDN, MSISDN) of the user.

IP Pref represents an IP prefix allocated by a network to the user.

In addition, an IP payload part shown in FIG. 4 includes specific data and signaling messages.

2. Based on the signaling message carried in the extended data packet, a base station device can trigger a PDU session establishment process or trigger to activate an established PDU session process. In the process of establishing or activating a PDU session, the data packet may be sent by using a sessionless method.

For example, the base station device selects the UPF based on the slice information carried in the received data packet, performs QoS control in a data forwarding process based on carried QoS information, and further records a path of the data packet. For a more specific processing process, refer to the following specific implementations.

Figure 5:
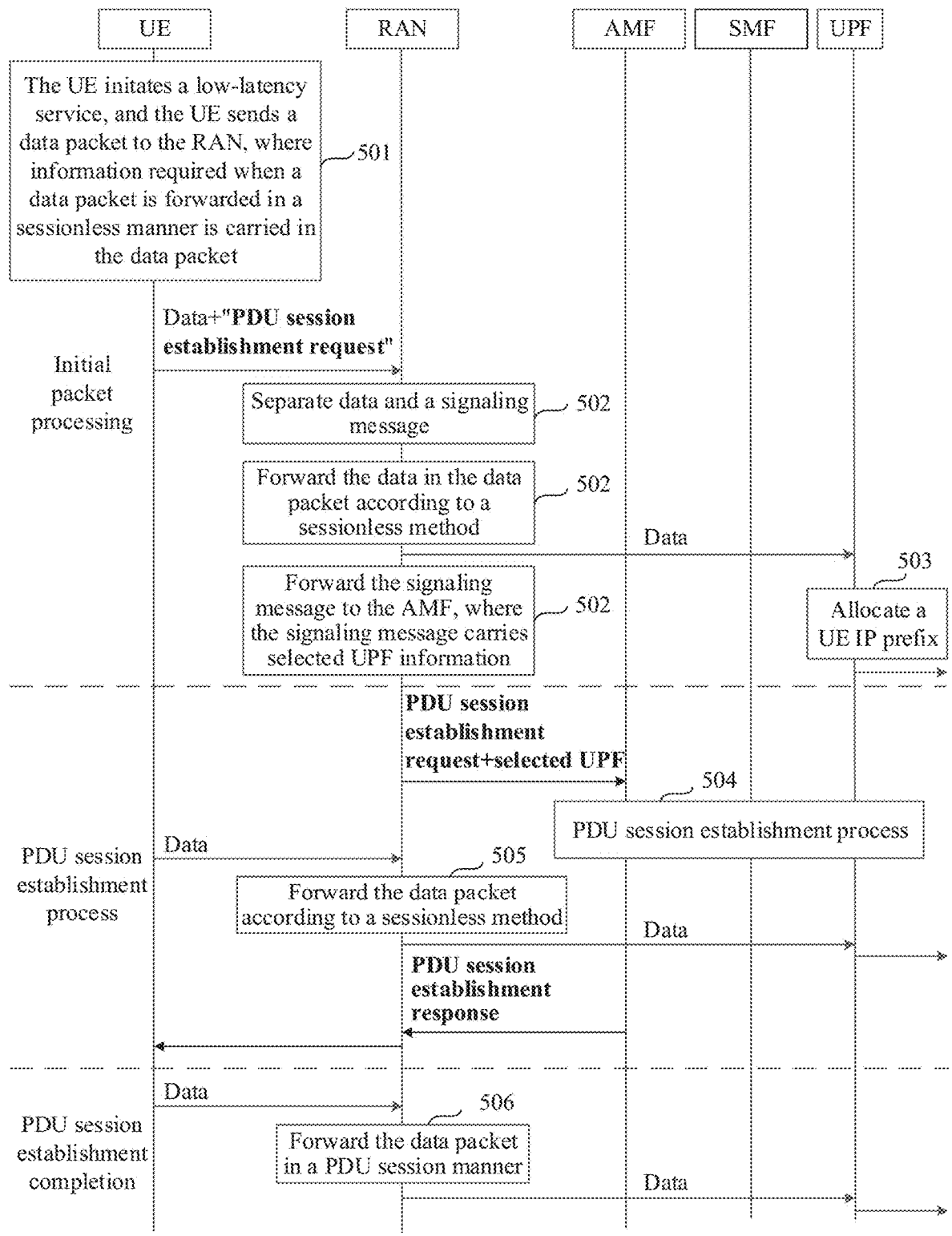
FIG. 5 is a schematic interaction flowchart of interaction between a plurality of network entities according to an embodiment of this disclosure.

FIG. 5 is a schematic interaction flowchart of a plurality of network entities according to an embodiment of this disclosure. Interaction is performed by UE, a RAN, an AMF entity, an SMF entity, and a UPF. Triggering a PDU session establishment process is used as an example. Referring to FIG. 5, an interaction process between network entities is as follows:

501. The UE initiates a low-latency service, and sends a first data packet to the RAN.

The data packet sent herein is specifically an uplink data packet. Before the UE sends the data packet, because a PDU session has not been established, the UE needs to further trigger a PDU session establishment process when sending the data packet. To be specific, the data packet sent by the UE further needs to carry a signaling message used to request to establish the PDU session. It should be noted that, the signaling message used to request to establish the PDU session is uniformly referred to as a first signaling message in the embodiments of this disclosure.

In addition, a data forwarding message such as NSSAI or QoS information required when the data packet is forwarded in a sessionless manner is further carried in the data packet. The UE further fills a UE ID in low-order 64 bits of a source address of the data packet, and sets high-order 64 bits to 0s.

502. After receiving the data packet sent by the UE, the RAN separates data and a signaling message from the data packet, forwards, in a sessionless manner, the data packet obtained after the separation, and further forwards the signaling message obtained through separation to the AMF entity, where the signaling message carries selected UPF information.

The selected UPF may also be referred to as a target UPF in the embodiments of this disclosure.

503. After receiving the data packet sent by the UE, the selected UPF allocates an IP prefix to the UE, and adds, to the high-order 64 bits in the source address of the data packet, the IP prefix allocated to the UE; and then the UPF sends the data packet.

The UPF specifically sends the data packet to a DN. The foregoing step 501 to step 503 are a process of processing the first packet.

504. The AMF entity and the SMF entity trigger a PDU session establishment process.

505. In the PDU session establishment process, the UE continues to send a data packet in a sessionless manner.

After PDU session establishment is completed, the AMF entity returns a PDU session establishment response to the RAN, and then the RAN forwards the PDU session establishment response to the UE.

506. After the PDU session establishment is completed, the data packet sent by the UE is forwarded by using the PDU session.

It should be noted that the bold part shown in FIG. 5 represents a signaling processing step, and the unbold part represents a data processing step.

Figure 6:
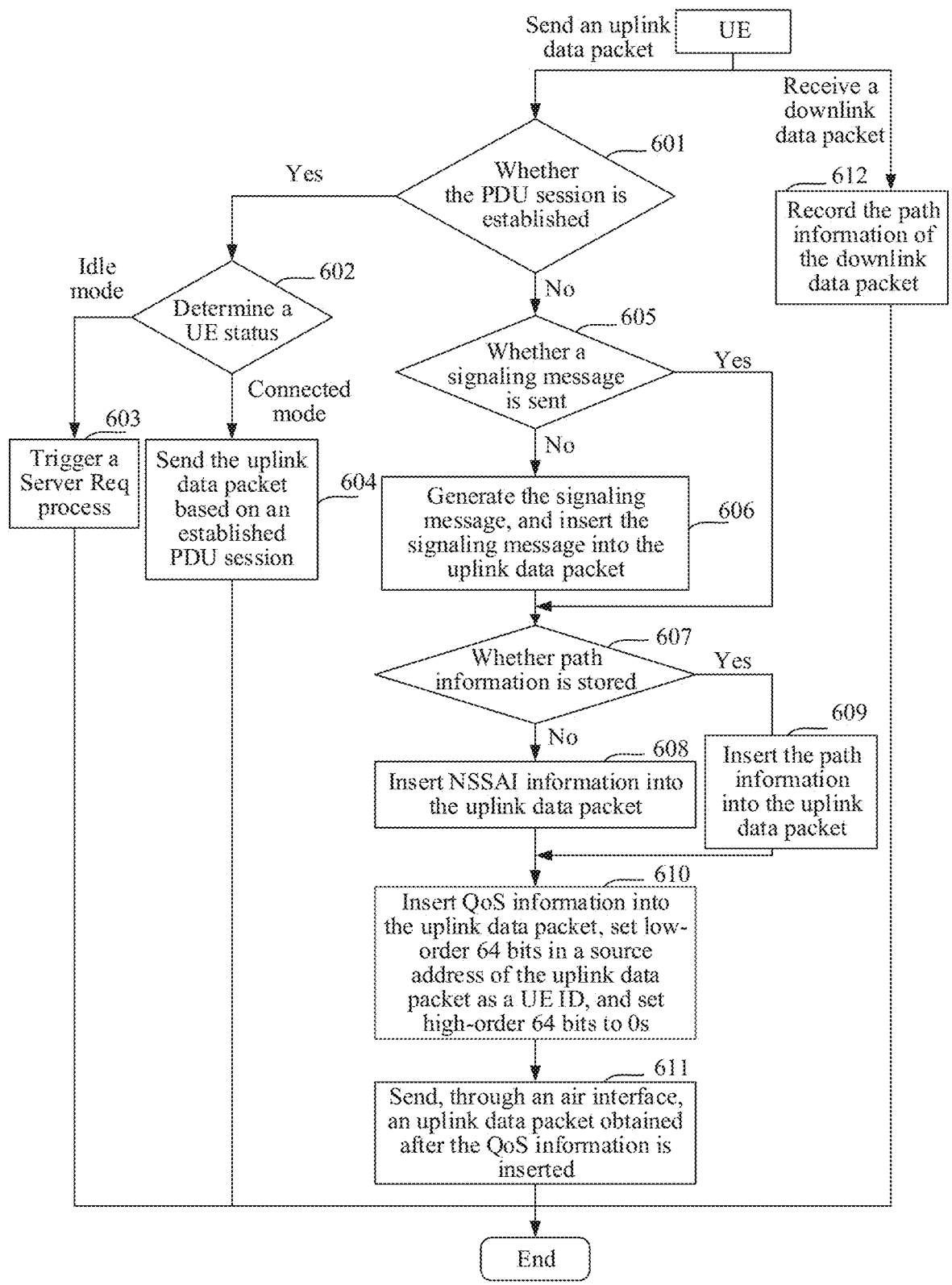
FIG. 6 is a flowchart of a data sending method according to an embodiment of this disclosure.

For example, another embodiment is described from a perspective of UE. Referring to FIG. 6, a specific procedure of a data sending method provided in an embodiment of the present invention is as follows:

601. The UE sends an uplink data packet, determines whether a PDU session is established. If the PDU session is established, step 602 is performed. If the PDU session is not established, step 605 is performed.

When the UE sends the uplink data packet, step 601 to step 611 are performed. When the UE receives a downlink data packet, step 612 is performed.

602. If the PDU session is established, a UE status is determined.

The UE status may be classified into a connected mode and an idle mode.

603. If the UE is in the idle mode, the UE triggers execution of a service request process.

Figure 10A:
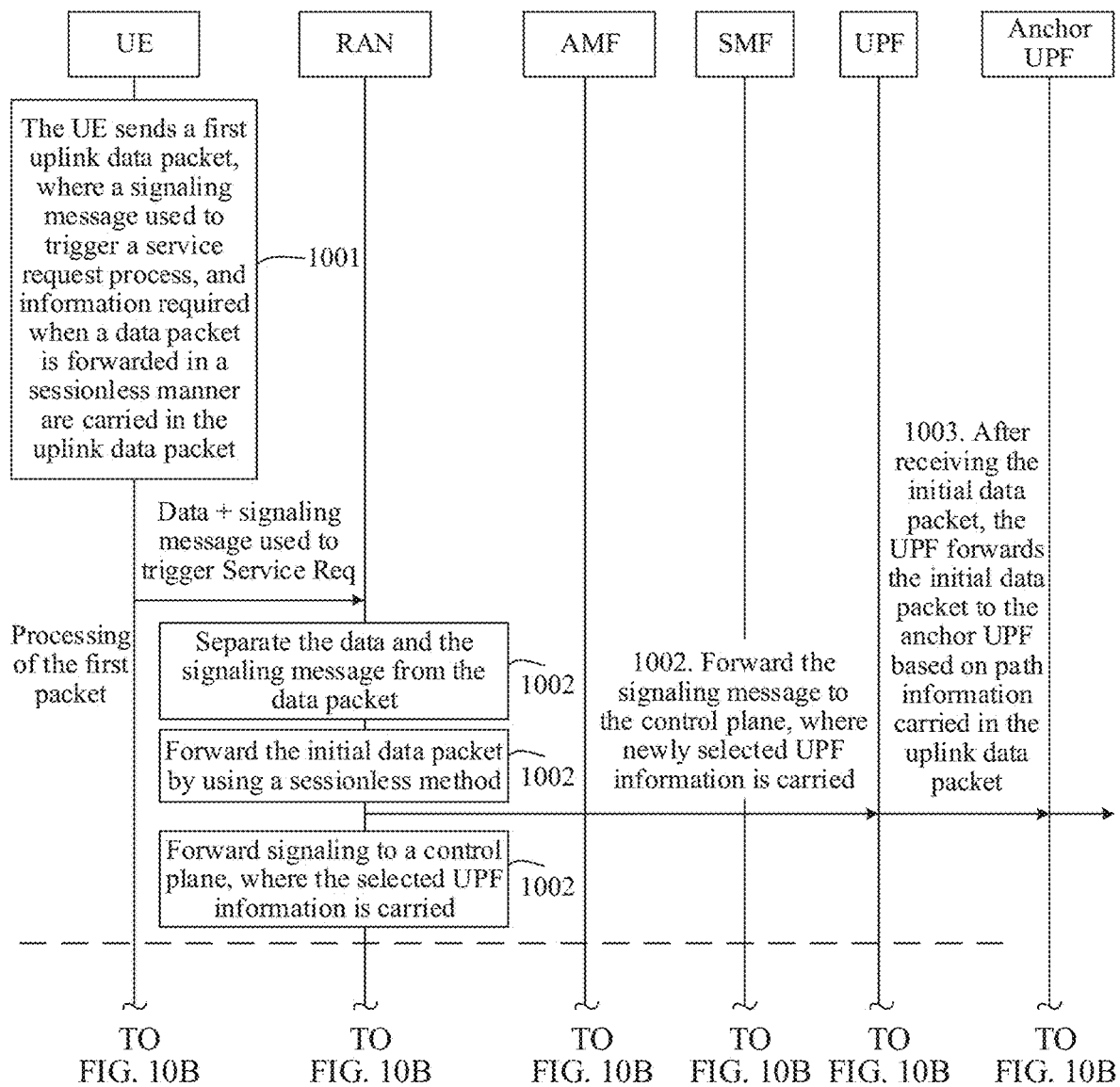
FIG. 10A and FIG. 10B is a flowchart of a data sending method according to an embodiment of this disclosure.
Figure 10B:
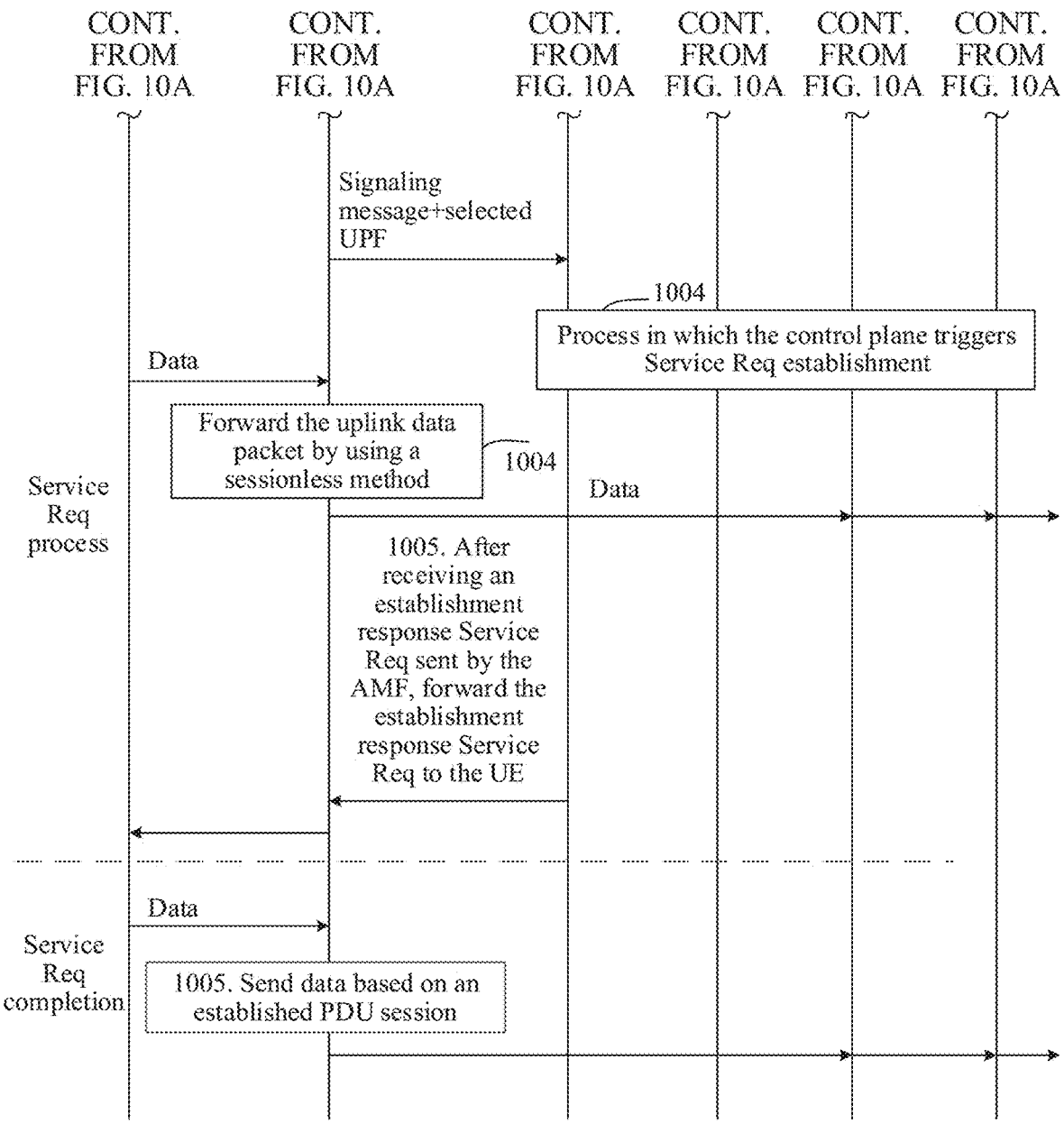

For detailed description, refer to a subsequent embodiment corresponding to FIG. 10A and FIG. 10B.

604. If the UE is in the connected mode, the data packet is forwarded by using the established PDU session.

605. If the PDU session is not established, the UE determines whether a first signaling message used to request to establish the PDU session is sent. If the first signaling message is not sent, step 606 is performed. If the first signaling message is sent, step 607 is performed.

606. If the first signaling message is not sent, the UE generates the first signaling message used to request to establish the PDU session, and inserts the first signaling message into the uplink data packet.

607. The UE determines whether path information is stored. If the path information is not stored, step 608 is performed. If the path information is stored, step 609 is performed.

608. If the path information is stored, the UE inserts the path information into the uplink data packet.

609. If the path information is not stored, the UE inserts NSSAI information into the uplink data packet.

610. The UE inserts QoS information into the uplink data packet, sets low-order 64 bits of a source address in the uplink data packet as a UE ID, and sets high-order 64 bits to 0s.

611. The UE sends the uplink data packet to a RAN through an air interface.

612. When receiving a downlink data packet, the UE records path information carried in the downlink data packet.

The foregoing describes, from the perspective of the UE, the data sending method provided in this embodiment of this disclosure.

Figure 7A:
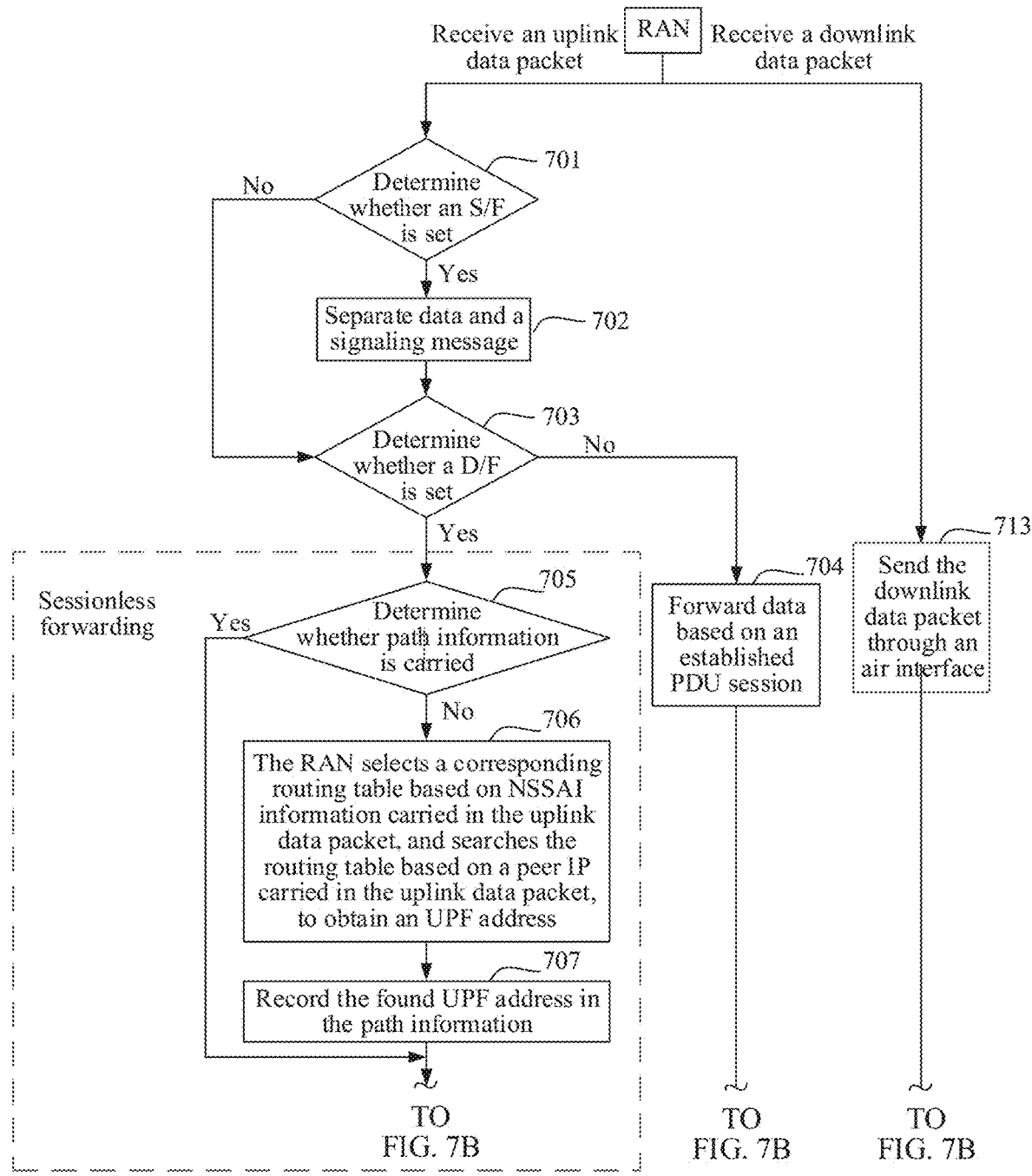
FIG. 7A and FIG. 7B are a flowchart of a data sending method according to an embodiment of this disclosure.
Figure 7B:
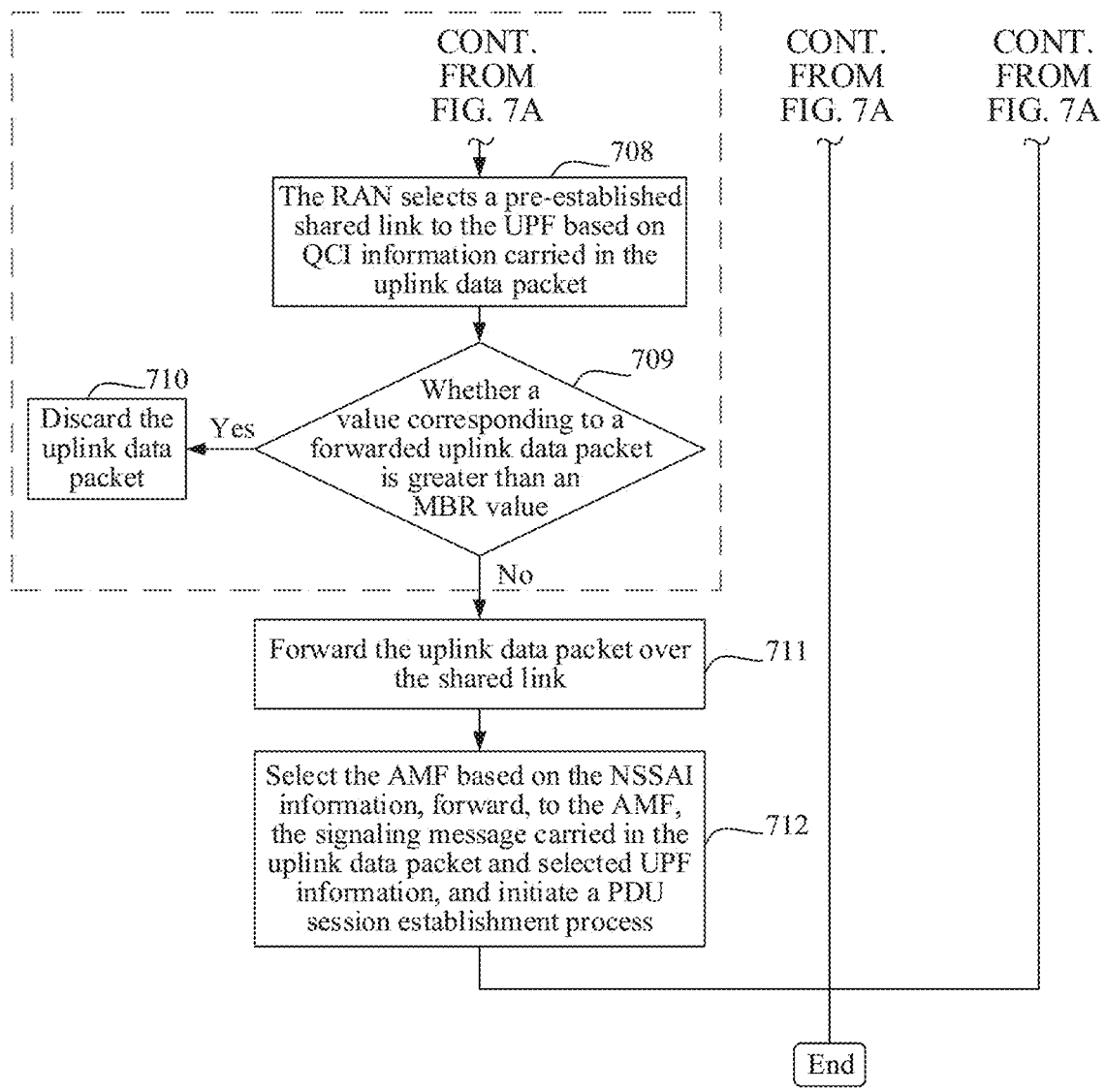

For example, another embodiment is described from a perspective of a RAN. Referring to FIG. 7A and FIG. 7B, a procedure of a data sending method provided in an embodiment of the present invention is as follows:

701. After receiving an uplink data packet sent by UE, the RAN determines whether a first signaling message flag S/F in the uplink data packet is set.

When the RAN receives the uplink data packet, step 701 to step 712 are performed. When the RAN receives a downlink data packet, step 713 is performed.

702. If the first signaling message flag S/F is set, the RAN determines that the first signaling message is carried in the uplink data packet, and separates data and the first signaling message from the uplink data packet.

703. Determine whether a data forwarding information flag D/F in the uplink data packet is set. If the data forwarding information flag D/F is not set, step 704 is performed. If the data forwarding information flag D/F is set, step 705 is performed.

704. If the data forwarding information flag is not set, it indicates that a PDU session is established, and data is forwarded based on the established PDU session.

705. If the data forwarding information flag is set, it indicates that a PDU session is not established, and the RAN continues to determine whether path information is carried in the uplink data packet.

706. If the path information is not carried, the RAN selects a corresponding routing table based on NSSAI information carried in the uplink data packet, and searches the routing table based on a peer IP carried in the uplink data packet, to obtain a UPF address of a target UPF The selected routing table may also be referred to as a target routing table in the embodiments of this disclosure. In addition, if the path information is carried in a data forwarding message, a UPF indicated by using the path information is directly used.

707. The RAN records the found UPF address into the path information of the uplink data packet.

708. The RAN selects a pre-established shared link to the target UPF based on QCI information carried in the uplink data packet.

It should be noted that some shared links such as a GPRS tunneling protocol (GTP) tunnel are pre-established between the RAN and the UPF These shared links corresponds to different QCI values, and link bandwidth is set based on a service model. In addition, the shared links can be further used to ensure that a user sends data with a QoS guarantee within a short period of time during which the PDU session is established.

709. The RAN performs bandwidth control based on an MBR value, and determines whether a forwarded uplink data packet is greater than the MBR value. If the forwarded uplink data packet is greater than the MBR value, step 710 is performed. If the forwarded uplink data packet is not greater than the MBR value, step 711 is performed.

710. If the forwarded uplink data packet is greater than the MBR value, the RAN discards the uplink data packet.

711. If the forwarded uplink data packet is not greater than the MBR value, the RAN forwards the uplink data packet over the selected shared link.

712. The RAN selects an AMF entity based on to the NSSAI information, forwards, to the selected AMF entity, the first signaling message carried in the uplink data packet and address information of the target UPF, and initiates a PDU session establishment process.

The selected AMF entity is also be referred to as a target AMF entity in this embodiment of this disclosure.

713. After receiving a downlink data packet, the RAN forwards the downlink data packet through an air interface.

The foregoing describes, from the perspective of the RAN, the data sending method provided in this embodiment of this disclosure.

Figure 8:
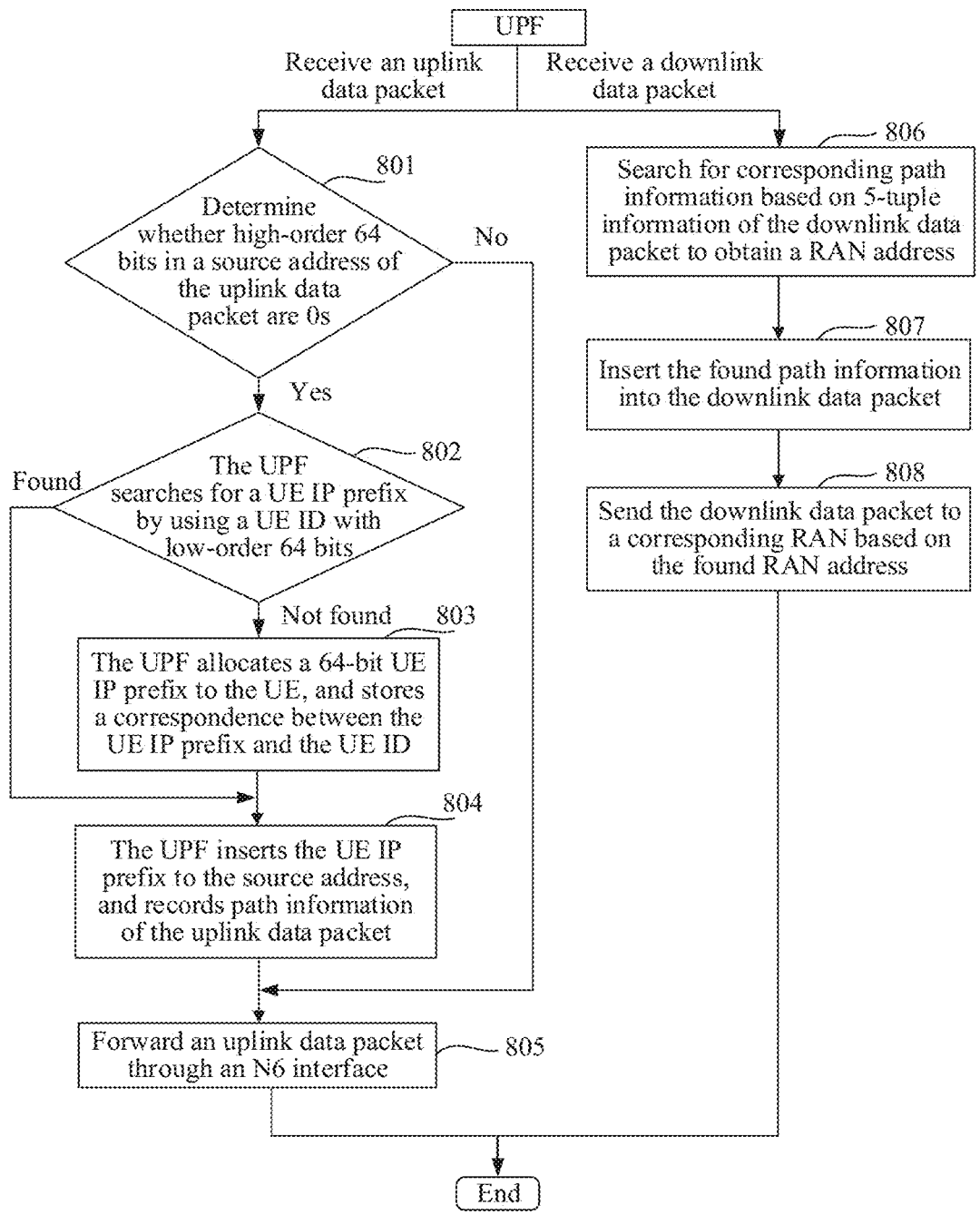
FIG. 8 is a flowchart of a data sending method according to an embodiment of this disclosure.

For example, another embodiment is described from a perspective of a UPF. Referring to FIG. 8, a procedure of a data sending method provided in an embodiment of this disclosure is as follows:

801. After receiving an uplink data packet forwarded by a RAN, the UPF determines whether high-order 64 bits in a source address of the uplink data packet are Os. If the high-order 64 bits in the source address of the uplink data packet are Os, step 802 is performed. If the high-order 64 bits in the source address of the uplink data packet are not Os, step 805 is performed.

802. If the high-order 64 bits are Os, the UPF searches for a UE IP prefix by using a UE ID with low-order 64 bits. If the UE IP prefix is not found, step 803 is performed. If the UE IP prefix is found, step 804 is performed.

803. If the UE IP prefix is not found, the UPF allocates a 64-bit UE IP prefix to UE, stores a correspondence between the UE IP prefix and the UE ID, and inserts the 64-bit UE IP prefix into the high-order 64 bits in the source address.

804. If the UE IP prefix is found, the UPF inserts the UE IP prefix into the high-order 64 bits in the source address, and records the path information of the uplink data packet.

805. The UPF forwards the uplink data packet through an N6 interface.

Further, if the UPF receives a downlink data packet, the following step 806 to step 808 are performed.

806. After receiving the downlink data packet, the UPF searches for corresponding path information based on 5-tuple information of the downlink data packet, to obtain a RAN address.

807. The UPF inserts the found path information into the downlink data packet.

808. The UPF sends the downlink data packet to a corresponding RAN based on the found RAN address.

The foregoing describes, from the perspective of the UPF, the data sending method provided in this embodiment of this disclosure.

Figure 9:
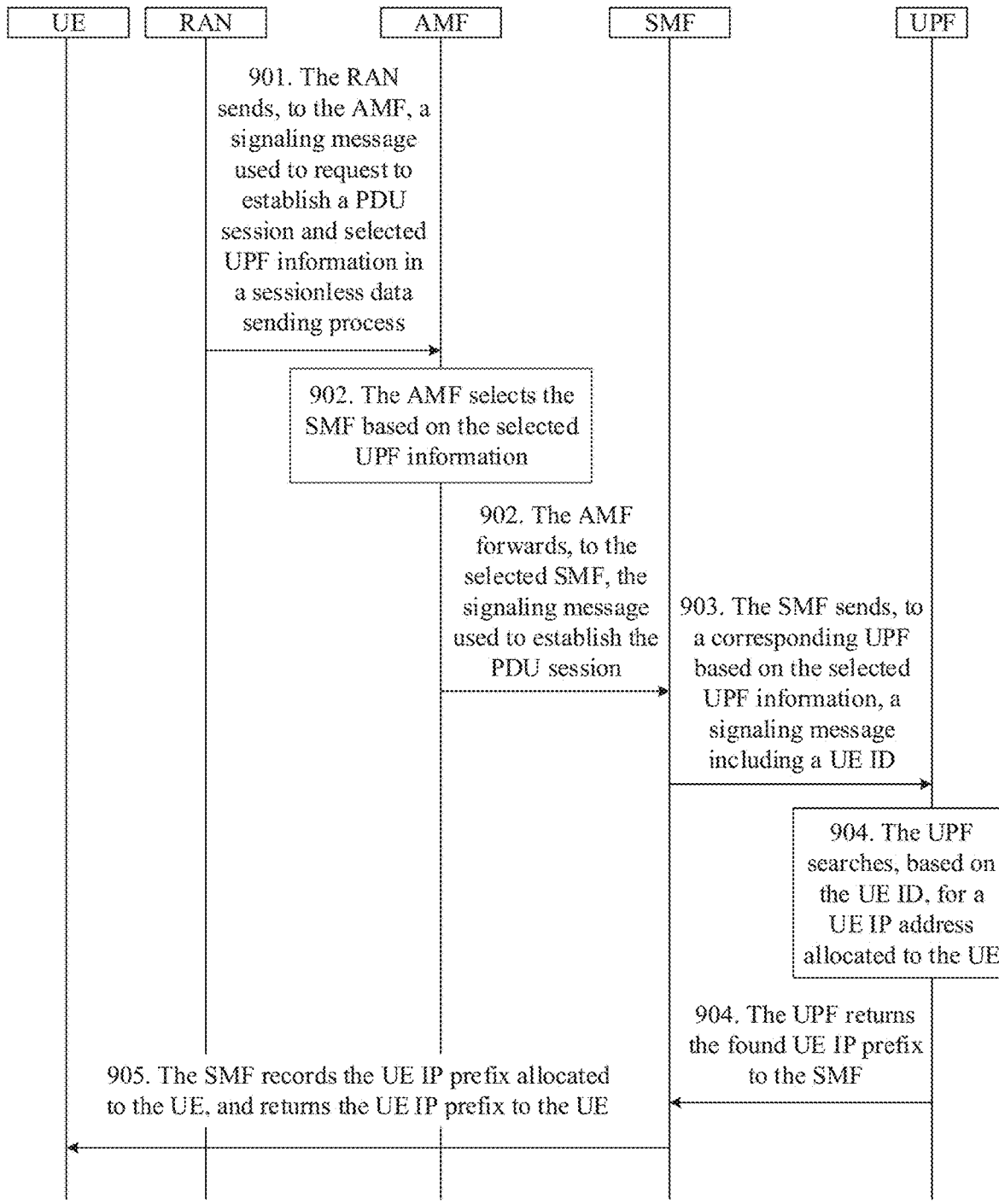
FIG. 9 is a flowchart of a data sending method according to an embodiment of this disclosure.

In another embodiment, with reference to the embodiments of FIG. 5 to FIG. 8, referring to FIG. 9, a PDU session establishment process provided in an embodiment of this disclosure is as follows:

901. A RAN sends, to a selected AMF entity, a first signaling message used to request to establish a PDU session and address information of a target UPF selected in a sessionless data sending process.

902. The selected AMF entity selects an SMF entity based on the address information of the target UPF, and forwards, to the selected SMF entity, the first signaling message used to request to establish the PDU session.

903. The selected SMF entity sends, to the target UPF based on the address information of the target UPF, a specified message including a UE ID.

The specified message is generated based on the first signaling message.

904. The target UPF searches, based on the UE ID, for a UE IP prefix allocated to UE, and returns the found UE IP prefix to the selected SMF entity.

905. The selected SMF entity records the UE IP prefix allocated to the UE, and returns the UE IP prefix to the UE.

It should be noted that a subsequent process of establishing the PDU session is the same as the process shown in FIG. 3A and FIG. 3B.

It should be further noted that a difference between the PDU session establishment process provided in this embodiment of this disclosure and that in FIG. 3A and FIG. 3B lies in that the RAN has selected the UPF, and the UPF has allocated the UE IP; and therefore, a control plane device does not need to allocate the UE IP again.

In conclusion, the embodiments shown in FIG. 5 to FIG. 9 provide a method for adding, to a data packet on a data link, a signaling message used to request to establish a PDU session, and the new method for sending a data packet in a sessionless manner. The signaling message, and information required when data is forwarded in a sessionless manner are carried in the data packet sent by the UE.

In addition, in the embodiments of this disclosure, the RAN selects the UPF, and the UPF allocates the UE IP prefix, to finally forward the data packet over the shared link.

In addition, in the embodiments of this disclosure, a PDU session establishment process of a control plane is further improved.

In the embodiments of this disclosure, for the embodiments shown in FIG. 5 to FIG. 9, the signaling message used to request to establish the PDU session is carried in the data packet on the data link. In addition, not only PDU session establishment is triggered, but also the data packet can be sent in a sessionless manner, so that the data packet can still be sent in real time when the PDU session is not established. Therefore, a latency requirement of a low-latency service is met.

In conclusion, the embodiments of this disclosure provide an implementation mechanism of a low-latency service, so that the UE can send the data packet before the PDU session establishment is completed. Therefore a low-latency service requirement of the user can be better met.

In addition, additional information is carried in the data packet. In this way, in the PDU session establishment process, corresponding QoS can be further guaranteed when the data packet is sent, thereby ensuring service experience for the user.

In addition, before sending the data packet, the UE does not need to exchange signaling with a network device in advance, to establish the PDU session, thereby reducing a session context storage requirement of the network device (such as the RAN, the UPF, the AMF entity, and the SMF entity).

In addition, when sending the data packet, the UE further sends the signaling message, thereby reducing a quantity of times of preemption of an air interface resource, saving air interface resources, and reducing processing overheads of the network device.

In addition, when data is sent, the PDU session establishment process may be further triggered, so that data can be sent before the PDU session establishment is completed, thereby reducing a data sending latency and improving service experience for the user.

In another embodiment, before the UE sends the uplink data packet, if the PDU session is established but the UE is in the idle mode, the UE further needs to trigger the service request process when sending the uplink data packet, to activate the established PDU session.

In comparison with the embodiments shown in FIG. 5 to FIG. 9, because the UE IP is allocated in this case, reallocation is not required. In addition, because the UE is in a movement state, reselection of a UPF may be further triggered. In this case, in this embodiment of this disclosure, a newly selected UPF and an initial UPF are included. The initial UPF, that is, a UPF that allocates a UE IP, may also be referred to as an anchor UPF.

In an embodiment of this disclosure, for step 603 mentioned in FIG. 6, when the UE is in the idle mode, this embodiment of this disclosure further includes a process of activating an established PDU session shown in FIG. 10A and FIG. 10B. A specific process is as follows:

1001. When the PDU session is established and the UE is in an idle mode, the UE sends a first uplink data packet, where a second signaling message used to activate the established PDU session and a data forwarding message required when the data packet is forwarded in a sessionless manner are carried in the uplink data packet.

The second signaling message includes a session ID of the PDU session to be activated. The data forwarding message required when the data packet is forwarded in a sessionless manner may include path information (an address of an anchor UPF), QoS information, and the like. This is not specifically limited in this embodiment.

1002. After receiving the first uplink data packet, a RAN separates data and the second signaling message from the data packet, forwards, in the sessionless manner, the data packet obtained after the separation, further forwards the second signaling message to a control plane device, and carries information about a newly selected UPF.

For this step, because the RAN does not have a context of the session, the first uplink data packet can be forwarded only by using a sessionless method. In addition, the RAN forwards the second signaling message to a control plane.

A reason why the information about the newly selected UPF is carried is as follows: In this case, the RAN and the anchor UPF may not be directly connected, and therefore, the first uplink data packet needs to be forwarded by using the new UPF.

1003. After receiving the first uplink data packet, the newly selected UPF forwards the first uplink data packet to the anchor UPF based on path information carried in the uplink data packet, and the anchor UPF forwards the first uplink data packet.

Specifically, the anchor UPF forwards the first uplink data packet to a DN. The path information includes specified address information. The specified address information is address information of an initial UPF.

1004. The control plane device triggers a service request establishment process, and in the service request establishment process, the control plane device forwards the uplink data packet by using a sessionless method.

It should be noted that the UPF is not selected again in this process.

1005. After receiving an establishment response sent by the control plane device, the RAN forwards the establishment response to the UE. In this case, the UE is in a connected mode and sends data based on the established PDU session.

In conclusion, the embodiment shown in FIG. 10A and FIG. 10B provides the method for adding, to a data packet on a data link, a second signaling message of a service request and the new method for sending a data packet in a sessionless manner.

For the embodiment shown in FIG. 10A and FIG. 10B, the second signaling message of the service request is carried in the data packet on the data link. In this case, when a service request process is triggered, the data packet is further sent in a sessionless manner. In this way, when the PDU session is established but the UE is in an idle mode, the established PDU session can be activated in the service request process. In addition, it can be further ensured that data is sent in real time, thereby meeting a low-latency requirement.

Figure 11:
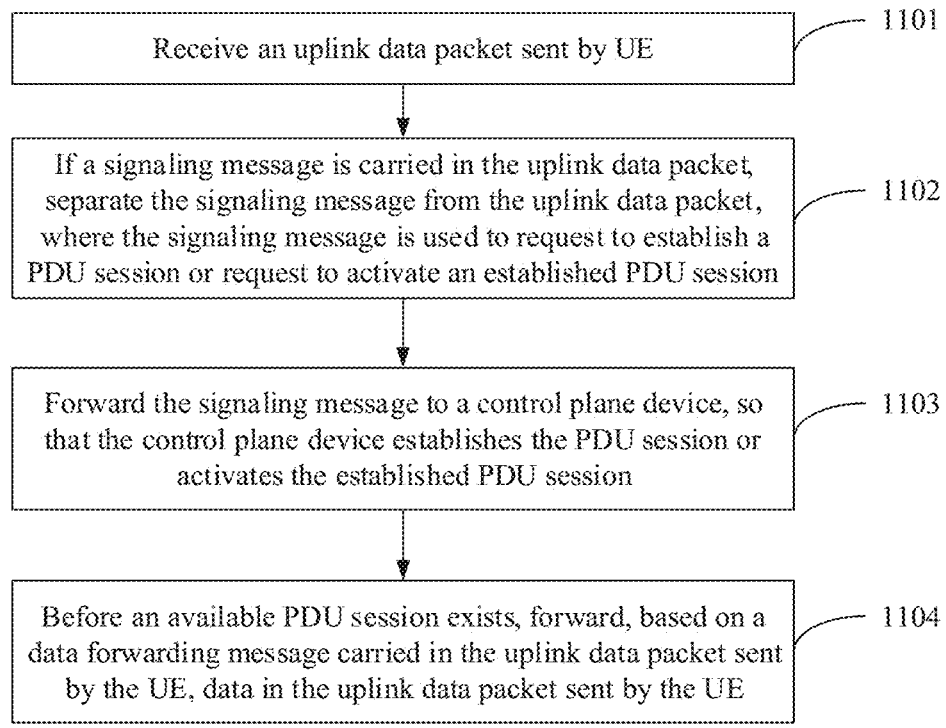
FIG. 11 is a flowchart of a data sending method according to an embodiment of this disclosure.

FIG. 11 is a flowchart of a data sending method according to an embodiment of this disclosure. Referring to FIG. 11, a method procedure provided in this embodiment of this disclosure is as follows:

1101. Receive an uplink data packet sent by UE.

1102. If a signaling message is carried in the uplink data packet, separate the signaling message from the uplink data packet, where the signaling message is used to request to establish a PDU session or request to activate an established PDU session.

1103. Forward the signaling message to a control plane device, so that the control plane device establishes the PDU session or activates the established PDU session.

1104. Before an available PDU session exists, forward, based on a data forwarding message carried in the uplink data packet sent by the UE, data in the uplink data packet sent by the UE.

According to the method provided in this embodiment of this disclosure, before the available PDU session exists, the UE adds, to the data packet on a data link, the signaling message used to request to establish the PDU session or request to activate the established PDU session, and further adds an additional data forwarding message to the data packet. In this way, when a PDU session establishment process or a PDU session activation process is triggered, the data can be further sent by using the data forwarding message carried in the data packet. Therefore, the data packet can still be sent in real time when no available PDU session exists, thereby greatly meeting a latency requirement of a low-latency service.

Figure 12:
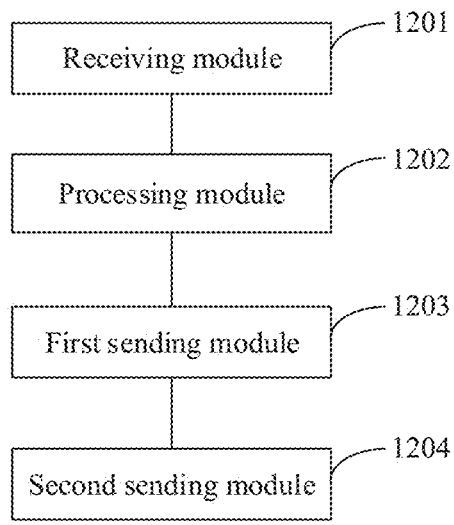
FIG. 12 is a schematic structural diagram of a data sending apparatus according to an embodiment of this disclosure.

FIG. 12 is a schematic structural diagram of a data sending apparatus according to an embodiment of this disclosure. The data sending apparatus is applied to a base station device. Referring to FIG. 12, the apparatus includes:

a receiving module 1201, configured to receive an uplink data packet sent by UE;

a processing module 1202, configured to: if a signaling message is carried in the uplink data packet, separate the signaling message from the uplink data packet, where the signaling message is used to request to establish a PDU session or request to activate an established PDU session;

a first sending module 1203, configured to forward the signaling message to a control plane device, so that the control plane device establishes the PDU session or activates the established PDU session; and a second sending module 1204, configured to: before an available PDU session exists, forward, based on a data forwarding message carried in the uplink data packet sent by the UE, data in the uplink data packet sent by the UE.

For the apparatus provided in this embodiment of this disclosure, before the available PDU session exists, the UE adds, to the data packet on a data link, the signaling message used to request to establish the PDU session or request to activate the established PDU session, and further adds an additional data forwarding message to the data packet. In this way, when a PDU session establishment process or a PDU session activation process is triggered, the data can be further sent by using the data forwarding message carried in the data packet. Therefore, the data packet can still be sent in real time when no available PDU session exists, thereby greatly meeting a latency requirement of a low-latency service.

In a possible implementation, the second sending module is configured to: determine whether the data forwarding message includes path information of the uplink data packet; if the data forwarding message includes the path information, determine a shared link between the base station device and a target UPF based on a quality of service QoS class identifier included in the data forwarding message, where the target UPF is a UPF indicated in the path information; and forward the data in the uplink data packet to the target UPF over the shared link.

In a possible implementation, the second sending module is configured to: determine whether the data forwarding message includes path information of the uplink data packet; if the data forwarding message does not include the path information, select a target routing table based on NSSAI included in the data forwarding message; search the target routing table based on an IP address that is of a communications peer end and that is carried in the uplink data packet, to obtain a target UPF; determine a shared link between the base station device and the target UPF based on a QoS class identifier included in the data forwarding message; and forward the data in the uplink data packet to the target UPF over the shared link.

In a possible implementation, the second sending module is configured to: determine whether a transmission rate of the uplink data packet is less than a specified MBR value; and if the transmission rate of the uplink data packet is less than the specified MBR value, forward the data in the uplink data packet to the target UPF over the shared link.

In a possible implementation, the first sending module is configured to: select a target AMF entity based on NSSAI included in the data forwarding message; and forward the signaling message to the target AMF entity.

In a possible implementation, the first sending module is further configured to: select a target AMF entity based on the NSSAI included in the data forwarding message; and forward address information of the target UPF to the target AMF entity.

All the foregoing optional technical solutions may be randomly combined to form optional embodiments of the present invention, and details are not described herein again.

Figure 13:
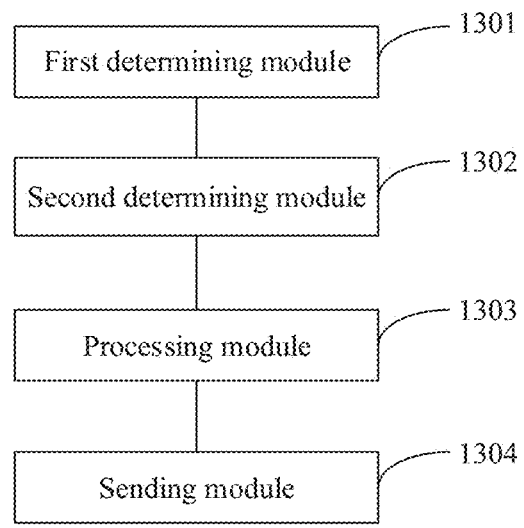
FIG. 13 is a schematic structural diagram of a data sending apparatus according to an embodiment of this disclosure.

FIG. 13 is a schematic structural diagram of a data sending apparatus according to an embodiment of this disclosure. The data sending apparatus is applied to UE. Referring to FIG. 13, the apparatus includes:

a first determining module 1301, configured to determine whether a PDU session is established;

a second determining module 1302, configured to: if the PDU session is not established, determine whether a first signaling message is sent, where the first signaling message is used to request to establish the PDU session;

a processing module 1303, configured to: if the first signaling information is not sent, insert the generated first signaling message into a to-be-sent uplink data packet, where the processing module 1303 is further configured to insert a data forwarding message into a to-be-sent uplink data packet; and a sending module 1304, configured to send, to a base station device, the uplink data packet obtained after the insertion, where the base station device is configured to: forward the first signaling message to a control plane device, and before establishment of the PDU session is completed, forward, based on the data forwarding message carried in the uplink data packet sent by the UE, data in the uplink data packet sent by the UE.

For the apparatus provided in this embodiment of this disclosure, before an available PDU session exists, the UE adds, to the data packet on the data link, the signaling message used to request to establish the PDU session, and further adds an additional data forwarding message to the data packet. In this way, when a PDU session establishment process is triggered, data can be further sent by using the data forwarding message carried in the data packet. Therefore, the data packet can still be sent in real time when no available PDU session exists, thereby greatly meeting a latency requirement of a low-latency service.

In a possible implementation, the apparatus further includes:

a third determining module, configured to: if the PDU session is established, determine whether the UE is in an idle mode, where the processing module is further configured to: if the UE is in the idle mode, insert a second signaling message into a to-be-sent uplink data packet, where the second signaling message is used to request to activate the established PDU session;

the processing module is further configured to insert a data forwarding message into the to-be-sent uplink data packet; and the sending module is further configured to send, to the base station device, the uplink data packet obtained after the insertion, where the base station device is configured to: forward the second signaling message to the control plane device, and before activation of the PDU session is completed, forward, based on the data forwarding message carried in the uplink data packet sent by the UE, the data in the uplink data packet sent by the UE.

In a possible implementation, the processing module is further configured to: determine whether path information of the uplink data packet is stored; if the path information is stored, insert the path information into the uplink data packet, or if the path information is not stored, insert NSSAI into the uplink data packet; insert QoS information into the uplink data packet, where the QoS information includes a QoS class identifier and an MBR value; set low-order N bits in a source address of the uplink data packet as identification information of the UE; and set high-order N bits in the source address of the uplink data packet to preset values.

All the foregoing optional technical solutions may be randomly combined to form optional embodiments of the present invention, and details are not described herein again.

Figure 14:
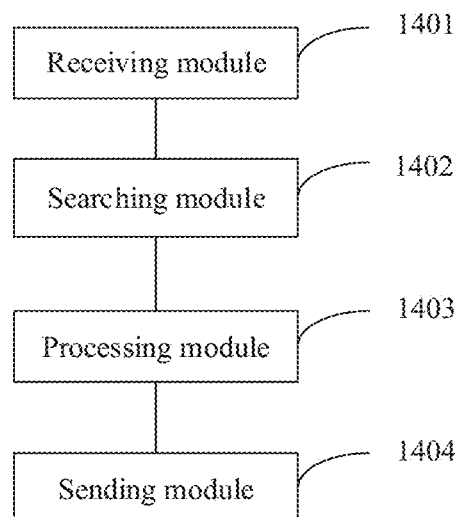
FIG. 14 is a schematic structural diagram of a data sending apparatus according to an embodiment of this disclosure.

FIG. 14 is a schematic structural diagram of a data sending apparatus according to an embodiment of this disclosure. The data sending apparatus is applied to a UPF. Referring to FIG. 14, the apparatus includes:

a receiving module 1401, configured to receive data in an uplink data packet forwarded by UE to a base station device, where the uplink data packet includes a first signaling message used to request to establish a PDU session;

a searching module 1402, configured to: if the high-order N bits in a source address of the uplink data packet are preset values, search for an Internet protocol IP prefix of the UE based on the low-order N bits in the source address:

a processing module 1403, configured to: if the IP prefix is found, insert the IP prefix into the high-order N bits in the source address, where the processing module 1403 is further configured to record path information of the uplink data packet; and a sending module 1404, configured to forward the data in the uplink data packet.

For the apparatus provided in this embodiment of this disclosure, before an available PDU session exists, the UE adds, to the data packet on a data link, the signaling message used to request to establish the PDU session or request to activate the established PDU session, and further adds an additional data forwarding message to the data packet. In this way, when a PDU session establishment process or a PDU session activation process is triggered, the data can be further sent by using the data forwarding message carried in the data packet. Therefore, the data packet can still be sent in real time when no available PDU session exists, thereby greatly meeting a latency requirement of a low-latency service.

In a possible implementation, the processing module is further configured to: if the IP prefix is not found, allocate an N-bit IP prefix to the UE; insert the allocated IP prefix into the high-order N bits in the source address; and record a correspondence between the allocated IP prefix and identification information of the UE.

In a possible implementation, the receiving module is further configured to receive data in an uplink data packet forwarded by the UE to the base station device, where the uplink data packet includes a second signaling message used to request to activate an established PDU session; and the sending module is further configured to forward the data in the uplink data packet to the initial UPF based on specified address information included in path information of the uplink data packet, so that the initial UPF forwards the data in the uplink data packet, where the specified address information is address information of the initial UPF, and the initial UPF is a UPF that allocates the IP prefix to the UE.

All the foregoing optional technical solutions may be randomly combined to form optional embodiments of the present invention, and details are not described herein again.

Figure 15:
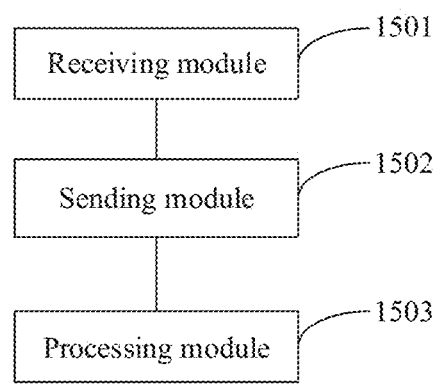
FIG. 15 is a schematic structural diagram of a data sending apparatus according to an embodiment of this disclosure.

FIG. 15 is a schematic structural diagram of a data sending apparatus according to an embodiment of this disclosure. The data sending apparatus is applied to an SMF entity on a control plane device. Referring to FIG. 15, the apparatus includes:

a receiving module 1501, configured to receive a first signaling message and address information of a target UPF that are forwarded by a target AMF entity, where the target AMF entity is configured to: determine a target SMF entity after receiving the address information sent by a base station device, and send the first signaling message and the address information to the target SMF entity;

a sending module 1502, configured to send, based on the address information, a specified message including identification information of user equipment UE to the target UPF, so that the target UPF searches, based on the identification information of the UE, for an IP prefix allocated to the UE, where the specified message is generated based on the first signaling message, where the receiving module 1501 is further configured to receive the IP prefix that is of the UE and that is returned by the target UPF; and a processing module 1503, configured to record the IP prefix of the UE, where the sending module 1502 is further configured to return the IP prefix to the UE.

For the apparatus provided in this embodiment of this disclosure, before an available PDU session exists, the UE adds, to the data packet on a data link, the signaling message used to request to establish the PDU session or request to activate the established PDU session, and further adds an additional data forwarding message to the data packet. In this way, when a PDU session establishment process or a PDU session activation process is triggered, data can be further sent by using the data forwarding message carried in the data packet. Therefore, the data packet can still be sent in real time when no available PDU session exists, thereby greatly meeting a latency requirement of a low-latency service.

It should be noted that when the data sending apparatus provided in the foregoing embodiments sends data, division of the foregoing function modules is used only as an example for description. In actual application, the foregoing functions may be completed by different function modules based on a requirement. In other words, an internal structure of the apparatus is divided into different function modules to complete all or some of the described functions. In addition, the data sending apparatus provided in the foregoing embodiments pertains to a same concept as the embodiments of the data sending method. For a specific implementation process, refer to the method embodiments. Details are not repeatedly described herein.

Figure 16:
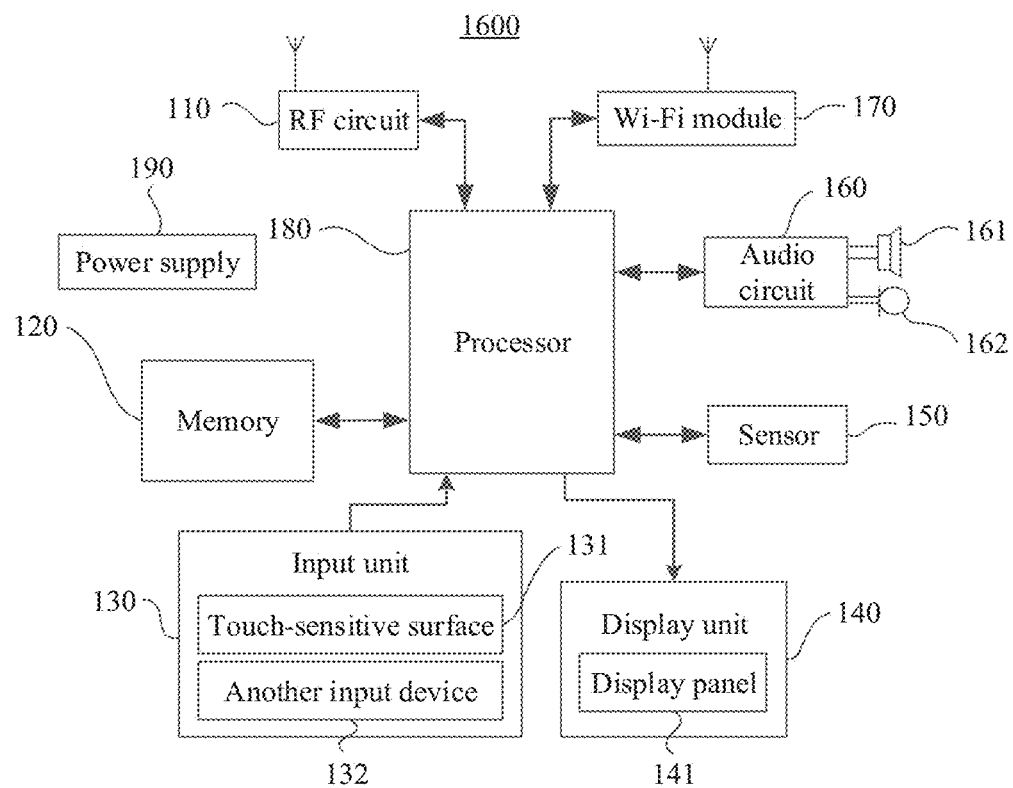
FIG. 16 is a schematic structural diagram of user equipment according to an embodiment of this disclosure.

An embodiment of this disclosure provides user equipment. The user equipment may be configured to perform the data sending methods provided in the foregoing embodiments. Referring to FIG. 16, the user equipment 1600 includes the following:

The user equipment 1600 may include components such as a radio frequency, (RF) circuit 110, a memory 120 including one or more computer readable storage media, an input unit 130, a display unit 140, a sensor 150, an audio circuit 160, a wireless fidelity, (WiFi) module 170, a processor 180 including one or more processing cores, and a power supply 190. A person skilled in the art may understand that the user equipment structure shown in FIG. 16 does not constitute any limitation on the user equipment. The user equipment 1600 may include more or fewer components than those shown in the figure, or some components may be combined, or the components are disposed differently.

The RF circuit 110 may be configured to receive and send signals during information receiving and sending processes or a call process. Particularly, after receiving downlink information from a base station, the RF circuit 110 delivers the downlink information to the one or more processors 180 for processing, and in addition, sends related uplink data to the base station. Generally, the RF circuit 110 includes but is not limited to an antenna, at least one amplifier, a tuner, one or more oscillators, a subscriber identity module (SIM) card, a transceiver, a coupler, a low noise amplifier (LNA), a duplexer, or the like. In addition, the RF circuit 110 may further communicate with a network and another device through wireless communication. Any communications standard or protocol can be used for the wireless communication, and includes but is not limited to a global system for mobile communications (GSM), a general packet radio service (GPRS), code division multiple access (CDMA), wideband code division multiple access (WCDMA), long term evolution LTE), an email, a short message service (Short Messaging Service, SMS), and the like.

The memory 120 may be configured to store a software program and a module. The processor 180 runs the software program and the module stored in the memory 120, to implement various functional applications and data processing. The memory 120 may mainly include a program storage area and a data storage area. The program storage area may be used to store an operating system, an application program required by at least one function (such as a sound playing function or an image playing function), and the like. The data storage area may be used to store data (such as audio data or a phone book) created based on use of the user equipment 1600, and the like. In addition, the memory 120 may include a high-speed random access memory, and may further include a nonvolatile memory such as at least one magnetic disk storage component, a flash memory, or another volatile solid-state storage component. Correspondingly, the memory 120 may further include a memory controller to provide access to the memory 120 for the processor 180 and the input unit 130.

The input unit 130 may be configured to receive input digit or character information, and generate keyboard, mouse, joystick, optical, or track ball signal input related to a user setting and function control. Specifically, the input unit 130 may include a touch-sensitive surface 131 and another input device 132. The touch-sensitive surface 131, also referred to as a touch display screen or a touch panel, may collect a touch operation of a user on or near the touch-sensitive surface (such as an operation of the user on or near the touch-sensitive surface 131 by using any proper object or accessory such as a finger or a stylus), and drive a corresponding connection apparatus according to a preset program. Optionally, the touch-sensitive surface 131 may include two parts: a touch detection apparatus and a touch controller. The touch detection apparatus detects a touch direction of a user, detects a signal brought by the touch operation, and transmits the signal to the touch controller. The touch controller receives touch information from the touch detection apparatus, converts the touch information into coordinates of a touch point, then sends the information to the processor 180, and receives and executes a command sent by the processor 180. In addition, the touch-sensitive surface 131 may be implemented by using a plurality of types, such as a resistive type, a capacitive type, infrared, and a surface acoustic wave. The input unit 130 may further include the another input device 132 in addition to the touch-sensitive surface 131. Specifically, the another input device 132 may include but is not limited to one or more of a physical keyboard, a function key (such as a volume control key or a power on/off key), a trackball, a mouse, a joystick, and the like.

The display unit 140 may be configured to display information entered by the user or information provided for the user, and various graphical user interfaces of the user equipment 1600. These graphical user interfaces may include an image, a text, an icon, a video, and any combination thereof. The display unit 140 may include a display panel 141. Optionally, the display panel 141 may be configured in a form of a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180 to determine a touch event type. Subsequently, the processor 180 provides corresponding visual output on the display panel 141 based on the touch event type. In FIG. 16, the touch-sensitive surface 131 and the display panel 141 are used as two separate components to implement input and output functions. However, in some embodiments, the touch-sensitive surface 131 and the display panel 141 may be integrated to implement the input and output functions.

The user equipment 1600 may further include at least one sensor 150, such as an optic sensor, a motion sensor, and another sensor. Specifically, the optic sensor may include an ambient light sensor and a proximity sensor. The ambient light sensor may adjust luminance of the display panel 141 based on brightness of ambient light. The proximity sensor may turn off the display panel 141 and/or backlight when the user equipment 1600 is moved to an ear. As one type of motion sensor, a gravity acceleration sensor may detect acceleration magnitudes in various directions (usually in three axes), may detect a magnitude and a direction of gravity in a static state, and may be applied to an application for recognizing a posture of a mobile phone (for example, switching between a landscape mode and a portrait mode, a related game, or magnetometer attitude calibration), a function related to vibration recognition (such as a pedometer and a knock), and the like. Other sensors such as a gyroscope, a barometer, a hygrometer, a thermometer, and an infrared sensor may be configured in the user equipment 1600. Details are not described herein.

The audio circuit 160, a speaker 161, and a microphone 162 can provide an audio interface between the user and the user equipment 1600. The audio circuit 160 may transmit, to the speaker 161, an electric signal obtained after received audio data is converted. The speaker 161 converts the electric signal into a sound signal for output. In addition, the microphone 162 converts a collected sound signal into an electric signal. After receiving the electric signal, the audio circuit 160 converts the electric signal into audio data, and outputs the audio data to the processor 180 for processing. Then, the processor 180 sends the audio data to, for example, another user equipment by using the RF circuit 110, or outputs the audio data to the memory 120 for further processing. The audio circuit 160 may further include an earphone jack to provide communication between a peripheral earphone and the user equipment 1600.

WiFi is a short distance wireless transmission technology. The user equipment 1600 may help, by using the WiFi module 170, the user receive and send emails, browse a web page, access streaming media, and the like, to provide wireless broadband Internet access for the user. Although FIG. 16 shows the WiFi module 170, it may be understood that the WiFi module 170 is not a mandatory part of the user equipment 1600, and may be omitted based on a requirement without changing the essence of the present invention.

The processor 180 is a control center of the user equipment 1600 and is connected to all parts of the entire mobile phone by using various interfaces and lines. The processor 180 runs or executes the software program and/or the module stored in the memory 120 and invokes data stored in the memory 120, to perform various functions of the user equipment 1600 and process data, to perform overall monitoring on the mobile phone. Optionally, the processor 180 may include one or more processing cores. Optionally, the processor 180 may integrate an application processor and a modem processor. The application processor mainly processes the operating system, a user interface, an application program, and the like. The modem processor mainly processes wireless communication. It may be understood that the modem processor may alternatively not be integrated into the processor 180.

The user equipment 1600 further includes the power supply 190 (such as a battery) supplying power to the components. Optionally, the power supply may be logically connected to the processor 180 by using a power management system, thereby implementing functions such as charging, discharging, and power consumption management by using the power management system. The power supply 190 may further include one or more of a direct current power supply or an alternating current power supply, a recharging system, a power failure detection circuit, a power converter or inverter, a power status indicator, and any other components.

Although not shown in the figure, the user equipment 1600 may further include a camera, a Bluetooth module, and the like, and details are not described herein. Specifically, in this embodiment, the display unit of the user equipment is a touchscreen display, and the user equipment further includes a memory and one or more programs, where the one or more programs are stored in the memory and are executed by the one or more processors after configuration.

In an example of an embodiment, a storage medium storing a computer program is further provided, for example, a memory storing a computer program. When the computer program is executed by a processor, a data sending method executed by the UE in the following embodiment is implemented. For example, the storage medium may be a read-only memory (ROM), a random access memory (RAM), a compact disc read-only memory (CD-ROM), or an optical data storage device.

Figure 17:
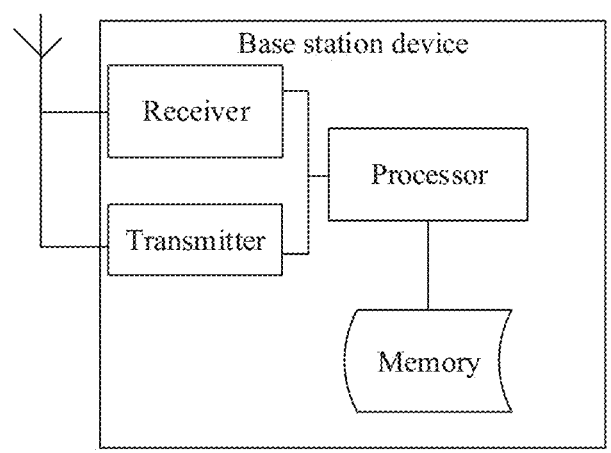
FIG. 17 is a schematic structural diagram of a base station device according to an embodiment of this disclosure.

FIG. 17 is a structural block diagram of a base station device according to an embodiment of this disclosure. The base station may include a transmitter, a receiver, a memory, and a processor separately connected to the transmitter, the receiver, and the memory. Certainly, the base station device may further include a universal component such as an antenna, a baseband processing component, an intermediate radio frequency processing component, or an input/output apparatus. This is not limited in this embodiment of this disclosure.

In an example embodiment, a storage medium storing a computer program is further provided, for example, a memory storing a computer program. When the computer program is executed by a processor, a data sending method executed by a base station device in the following embodiment is implemented. For example, the storage medium may be a ROM, a RAM a CD-ROM, an optical data storage device, or the like.

In another example embodiment, a user plane network element is provided. The user plane network element may include a transmit unit, a receive unit, a memory, and a processor separately connected to the transmit unit, the receive unit, and the memory.

In addition, a storage medium storing a computer program is further provided, for example, a memory storing a computer program. When the computer program is executed by a processor, a data sending method executed by a user plane network element in the following embodiment is implemented. For example, the storage medium may be a ROM, a RAM, a CD-ROM, an optical data storage device, or the like.

In another example embodiment, an SMF entity is provided. The SMF entity may include a transmit unit, a receive unit, a memory, and a processor separately connected to the transmit unit, the receive unit, and the memory.

In addition, a storage medium storing a computer program is further provided, for example, a memory storing a computer program. When the computer program is executed by a processor, a data sending method executed by an SMF entity in the following embodiment is implemented. For example, the storage medium may be a ROM, a RAM, a CD-ROM, an optical data storage device, or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are only optional embodiments of this disclosure, but are not intended to limit this disclosure. Any modification, equivalent replacement, improvement, or the like made without departing from the spirit and principle of this disclosure should fall within the protection scope of this disclosure.

What is claimed is:

1. A data sending method, wherein the method is applied to a base station device and comprises:
   receiving an uplink data packet sent by user equipment (UE), wherein the uplink data packet includes a signaling message that requests to establish a packet data unit (PDU) session or to activate an established PDU session, a data forwarding message, and data that is separate from the signaling message and the data forwarding message;
   forwarding the signaling message to a control plane device for establishing the PDU session or activating the established PDU session in response to the signaling message;
   determining whether the data forwarding message comprises path information of the uplink data packet;
   in response to determining that the data forwarding message comprises the path information, determining a target user plane network element (UPF) based on a quality of service (QoS) class identifier comprised in the path information;
   in response to determining that the data forwarding message does not comprise the path information, selecting a target routing table based on network slice selection assistance information (NSSAI) comprised in the data forwarding message to determine the target UPF;
   determining a shared link between the base station device and the target UPF;
   and
   without waiting for the PDU session to be established or the established PDU session to be activated, forwarding, based on the data forwarding message carried in the uplink data packet sent by the UE, the data in the uplink data packet sent by the UE.

2. The method according to claim 1, wherein the determining the shared link between the base station device and the target UPF comprises:
   determining whether the data forwarding message comprises path information of the uplink data packet;

in response to determining that the data forwarding message does not comprise the path information, searching the target routing table based on an Internet protocol (IP) address that is of a communications peer end and that is carried in the uplink data packet, to obtain the target UPF; and determining the shared link between the base station device and the target UPF based on a QoS class identifier comprised in the data forwarding message.

3. The method according to claim 1, wherein the forwarding the data in the uplink data packet to the target UPF over the shared link comprises:

determining whether a transmission rate of the uplink data packet is less than a specified maximum bit rate (MBR) value; and in response to determining that the transmission rate of the uplink data packet is less than the specified MBR value, forwarding the data in the uplink data packet to the target UPF over the shared link.

4. The method according to claim 1, wherein the forwarding the signaling message to a control plane device comprises:

selecting a target access control and mobility management function (AMF) entity based on the NSSAI comprised in the data forwarding message; and forwarding the signaling message to the target AMF entity.

5. The method according to claim 1, wherein the method further comprises:

selecting a target AMF entity based on the NSSAI comprised in the data forwarding message; and forwarding address information of the target UPF to the target AMF entity.

* * * * *

UNITED STATES PATENT AND TRADEMARK OFFICE
CERTIFICATE OF CORRECTION

| | |
|---|---|
| PATENT NO. | : 11,627,486 B2 |
| APPLICATION NO. | : 16/832524 |
| DATED | : April 11, 2023 |
| INVENTOR(S) | : Fei Yang et al. |

It is certified that error appears in the above-identified patent and that said Letters Patent is hereby corrected as shown below:

In the Claims

In Column 22, Line 67, in Claim 2, before "path" insert -- the --.

Signed and Sealed this
Thirteenth Day of June, 2023

Katherine Kelly Vidal
*Director of the United States Patent and Trademark Office*